United States Patent
Nakagawa et al.

(10) Patent No.: US 7,406,262 B2
(45) Date of Patent: Jul. 29, 2008

(54) OPTICAL TRANSMISSION DEVICE

(75) Inventors: Goji Nakagawa, Kawasaki (JP);
Hideyuki Miyata, Kawasaki (JP);
Yutaka Kai, Kawasaki (JP); Hiroshi Onaka, Kawasaki (JP); Setsuo Yoshida, Yokohama (JP); Kyosuke Sone, Kawasaki (JP); Tomohiro Ueno, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 11/082,958

(22) Filed: Mar. 18, 2005

(65) Prior Publication Data

US 2005/0169633 A1 Aug. 4, 2005

Related U.S. Application Data

(63) Continuation of application No. PCT/JP03/04793, filed on Apr. 15, 2003.

(51) Int. Cl.
*H04J 14/02* (2006.01)
(52) U.S. Cl. .......................................... 398/85; 398/83
(58) Field of Classification Search .................. 398/83, 398/85, 79
See application file for complete search history.

(56) References Cited

U.S. PATENT DOCUMENTS

| 5,369,516 | A * | 11/1994 | Uchida ........................ 398/60 |
| 6,323,975 | B1 | 11/2001 | Kurki |
| 6,538,782 | B1 * | 3/2003 | Otsuka et al. ................. 398/82 |
| 2002/0097467 | A1 * | 7/2002 | Terahara et al. ............. 359/142 |

FOREIGN PATENT DOCUMENTS

| EP | 0452895 | 10/1991 |
| EP | 0961424 | 12/1999 |
| JP | 4-68930 | 3/1992 |
| JP | 09-18421 A | 1/1997 |
| JP | 11-218790 | 8/1999 |
| JP | 11-340919 | 12/1999 |

OTHER PUBLICATIONS

Patent Abstracts of Japan, Publication No. 04-068930, Published Mar. 4, 1992.

(Continued)

*Primary Examiner*—Jason Chan
*Assistant Examiner*—Quan-Zhen Wang
(74) *Attorney, Agent, or Firm*—Staas & Halsey LLP

(57) ABSTRACT

An optical transmission device improved in quality and reliability of OADM function and permitting configuration of highly-flexible, economical OADM networks. A wavelength tunable filter variably selects a wavelength according to a control frequency. A filter controller applies the control frequency to the filter while scanning wavelength over an entire signal bandwidth, to detect, from a reference wavelength monitor signal supplied thereto, a reference control frequency which permits the filter to select a reference wavelength and according to which wavelength is matched. On receiving a wavelength selection request, the controller obtains a target control frequency from the reference control frequency and the position of a target wavelength relative to the reference wavelength, and applies the obtained frequency to the filter. A reference wavelength filter transmits the reference wavelength therethrough. A light-receiving element monitors the transmitted reference wavelength to generate the monitor signal.

34 Claims, 36 Drawing Sheets

OTHER PUBLICATIONS

Patent Abstracts of Japan, Publication No. 09-018421, Published Jan. 17, 1997.
Patent Abstracts of Japan, Publication No. 11-218790, Published Aug. 10, 1999.
Patent Abstracts of Japan, Publication No. 11-340919, Published Dec. 10, 1999.
Patent Abstracts of Japan, Publication No. 2000-206362, Published Jul. 28, 2000.
Int'l Search Report dated Jul. 15, 2003 in priority PCT/JP03/04793.
British Office Action dated Aug. 10, 2006 citing the above-referenced and two references already of record.

* cited by examiner

OPTICAL TRANSMISSION DEVICE

This application is a continuing application, filed under 35 U.S.C. §111(a), of International Application PCT/JP2003/004793, filed Apr. 15, 2003.

BACKGROUND OF THE INVENTION

1. Field of the Invention

The present invention relates to optical transmission devices, and more particularly, to an optical transmission device for transmitting an optical WDM (Wavelength Division Multiplex) signal.

2. Description of the Related Art

As a result of an explosively increasing demand for data communications chiefly via the Internet traffic, backbone networks are required to have larger capacity and to cover even longer distances. Also, because of diversification of services that users make use of, there has been a demand for networks which have high reliability and flexibility and yet are economical.

Especially, optical communication networks form the basis of the infrastructure of information communication networks. Thus, optical communication networks are required to provide wider coverage of even more sophisticated services and development thereof is currently rapidly advanced for an information-oriented society. In optical transmission systems, WDM technology is widely used as key technology. WDM is a technique whereby light beams of different wavelengths are multiplexed to allow multiple signals to be simultaneously transmitted over a single optical fiber.

In order for various processes to be performed separately on optical paths in an optical wavelength region, a WDM transmission node carries out OADM (Optical Add Drop Multiplex) control for dropping (Drop) or adding (Add) an optical signal of specified wavelength, without converting optical signals to electrical signals.

To achieve OADM, a wavelength tunable filter capable of variably selecting a desired one of the wavelengths multiplexed in a WDM signal is required. As such wavelength tunable filter, an AOTF (Acousto-Optic Tunable Filter) is widely used.

The AOTF filters out a desired wavelength by inducing a change in refractive index of an optical waveguide through an acousto-optic effect (diffraction of light by a sound wave excited in a substance or on the surface thereof), to rotate the polarization state of light propagated through the optical waveguide and thereby separate/select a spectral component. The AOTF can be tuned in over a wide wavelength range by varying the sound wave frequency (RF: Radio Frequency) applied thereto and thus is considered a potential device useful in configuring OADM.

Meanwhile, optical communication networks are subjected to an optical signal continuity test in order to maintain reliability of optical communication. The optical continuity test is performed to determine whether a specific optical signal reaches a predetermined spot or not, and an optical loopback test, for example, is conducted for the purpose. In the optical loopback test, an optical signal is sent out and redirected back at a predetermined spot, to determine whether the redirected signal can be received or not, thereby checking the continuity of a path up to the redirected spot. Such a continuity test permits a faulty device or a faulty spot in a communication line to be located from a remote place, making it possible to enhance the efficiency of maintenance and inspection.

As control techniques for conventional optical continuity tests, there has been proposed a technique wherein a 1×2 optical switch with one input and two branch outputs is provided in an optical communication path and a continuity test is performed with the optical switch switched to a loopback path (see Unexamined Japanese Patent Publication No. H09-18421 (paragraph nos. [0024] to [0026], FIG. 4), for example).

In conventional wavelength selection using an AOTF, wavelength is scanned with an RF signal based on wavelength channel information sent from a node, to count the number of peaks so that a desired wavelength may be tuned in for filtering. This procedure is followed because the temperature dependency of the wavelength selection by an AOTF is as large as about 0.7 nm per 1° C. and the AOTF does not have the function of detecting an absolute wavelength (a fluctuation-free, fixed wavelength on the wavelength axis).

Thus, in the conventional wavelength selection by means of an AOTF, the number of wavelength peaks is counted to detect a desired wavelength, and accordingly, there is a possibility that noise such as a side-peak is erroneously detected as a wavelength signal. If a side-peak is regarded as a substantial peak, then it is not possible to connect with a target node, giving rise to a problem that connection is established with a wrong node different from the target node, for example.

As regards absolute wavelength measurement, a device capable of detecting a desired absolute wavelength has been put on the market (e.g., WDM monitor (WD200) from Yokogawa Electric Corporation), and such a device may be used to carry out wavelength selection. However, the device uses the combination of a diffraction grating for wavelength dispersion and a PD array and thus is costly (over ¥1,000,000 per unit) as well as large-sized (170×220×28 mm). Accordingly, the device is not applicable to nodes which need to be reduced in cost and size, such as those used in a metropolitan area network or an access network.

According to the conventional optical continuity testing technique (Unexamined Japanese Patent Publication No. H09-18421), on the other hand, when a loopback test is performed, the communication path is cut off because of the switching of the optical switch, and therefore, it is not possible to conduct the continuity test on a specific wavelength only.

For example, suppose the case where only a wavelength $\lambda 1$, among wavelengths $\lambda 1$ to $\lambda 8$ multiplexed in a WDM signal, is to be subjected to the continuity test. With the conventional technique, the communication line itself is switched by the optical switch, so that all the wavelengths $\lambda 1$ to $\lambda 8$ are redirected back, giving rise to a problem that the communication is disrupted if any node is communicating using the wavelengths $\lambda 2$ to $\lambda 8$.

For an OADM node, on the other hand, the capability to add and drop (Add/Drop) a desired wavelength is essential for flexible operation of networks. During operation of a network in which desired wavelengths are selected and separated, if a wrong wavelength is added, data is transmitted to a node different from the target node, possibly causing the node receiving the erroneously transmitted data to go down. Especially, in the case of in-service installation of an extension unit or the like, if an expansion slot is fitted with a wrong unit with different wavelength settings, the operation of the network becomes anomalous, which is fatal to the network.

Conventional OADM networks do not have a wavelength monitoring mechanism and thus are unable to automatically determine whether or not desired wavelengths have been added/dropped. Also, even if an extension unit with different wavelength settings is erroneously inserted at the time of in-service installation of the unit, no one may possibly notice that the unit is communicating with a node different from the settings, because of lack of a wavelength monitoring mechanism. Further, the conventional OADM networks do not have a protective mechanism (fail-safe mechanism) for providing protection in case a wrong unit is inserted, and thus the network goes down if the worst comes to the worst.

SUMMARY OF THE INVENTION

The present invention was created in view of the above circumstances, and an object thereof is to provide an optical transmission device which is improved in quality and reliability of OADM function and which permits configuration of highly flexible and economical OADM networks.

To achieve the object, the present invention provides an optical transmission device for transmitting an optical WDM signal. The optical transmission device comprises a wavelength selector and a reference wavelength monitor. The wavelength selector includes a wavelength tunable filter for variably selecting a wavelength in accordance with a control frequency, and a filter controller for applying the control frequency to the wavelength tunable filter while scanning wavelength over an entire signal bandwidth, to detect, based on a reference wavelength monitor signal supplied thereto, a reference control frequency which permits the wavelength tunable filter to select a reference wavelength and in accordance with which wavelength matching is performed, and for obtaining, on reception of a wavelength selection request, a target control frequency based on the reference control frequency and a relative position of a target wavelength to be selected with respect to the reference wavelength, and applying the target control frequency to the wavelength tunable filter. The reference wavelength monitor includes a reference wavelength filter for transmitting the reference wavelength therethrough, and a light receiving element for monitoring the transmitted reference wavelength to generate the reference wavelength monitor signal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 illustrates the characteristic of a reference wavelength filter, wherein FIG. 12(A) shows input light, FIG. 12(B) shows transmitted light, and FIG. 12(C) shows reflected light.

FIG. 13 illustrates the characteristic of another reference wavelength filter, wherein FIG. 13(A) shows input light, FIG. 13(B) shows transmitted light, and FIG. 13(C) shows reflected light.

DESCRIPTION OF THE PREFERRED EMBODIMENTS

Figure 1:
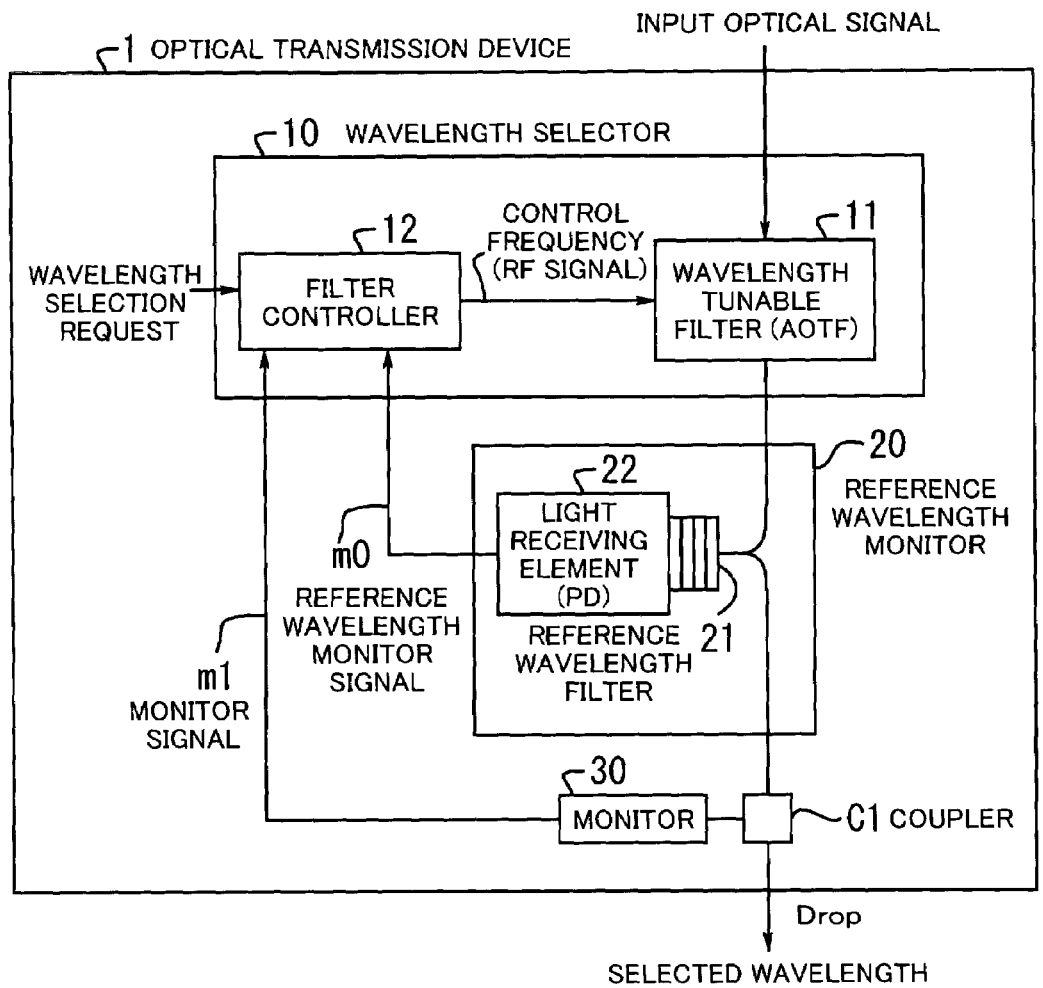
FIG. 1 illustrates the principle of an optical transmission device according to the present invention.

Preferred embodiments of the present invention will be described below with reference to the accompanying drawings. FIG. 1 illustrates the principle of an optical transmission device according to the present invention. The optical transmission device 1 comprises a wavelength selector 10, a reference wavelength monitor 20 and a monitor 30, and transmits an optical WDM signal.

The wavelength selector 10 includes a wavelength tunable filter 11 and a filter controller 12. The wavelength tunable filter (hereinafter AOTF) 11 variably selects a wavelength in accordance with a control frequency (RF signal frequency).

The filter controller 12 applies an RF signal to the AOTF 11 while scanning wavelength over an entire signal bandwidth. Based on a reference wavelength monitor signal m0 then received, the filter controller detects a reference control frequency (hereinafter reference RF) which permits the AOTF 11 to select a reference wavelength and in accordance with which wavelength matching is performed.

Also, when a wavelength selection request is received, the filter controller obtains a target control frequency (hereinafter target RF) based on the reference RF and a relative position of a target wavelength to be selected with respect to the reference wavelength, and applies the target RF to the AOTF 11. In accordance with the target RF, the AOTF 11 passes the target wavelength in an input optical signal therethrough.

The reference wavelength monitor 20 includes a reference wavelength filter 21 and a light receiving element (hereinafter PD: Photo Diode) 22. The reference wavelength filter 21 transmits the reference wavelength therethrough, and the PD 22 monitors the transmitted reference wavelength to generate the reference wavelength monitor signal m0.

The monitor 30 monitors, through a coupler C1, the wavelength transmitted through the AOTF 11, and generates a monitor signal m1. When a target wavelength is to be selected by the AOTF 11, the filter controller 12 varies, based on the monitor signal m1, the frequency of the RF signal in the vicinity of the target RF to determine an optimum target control frequency (hereinafter optimum target RF).

Figure 7:
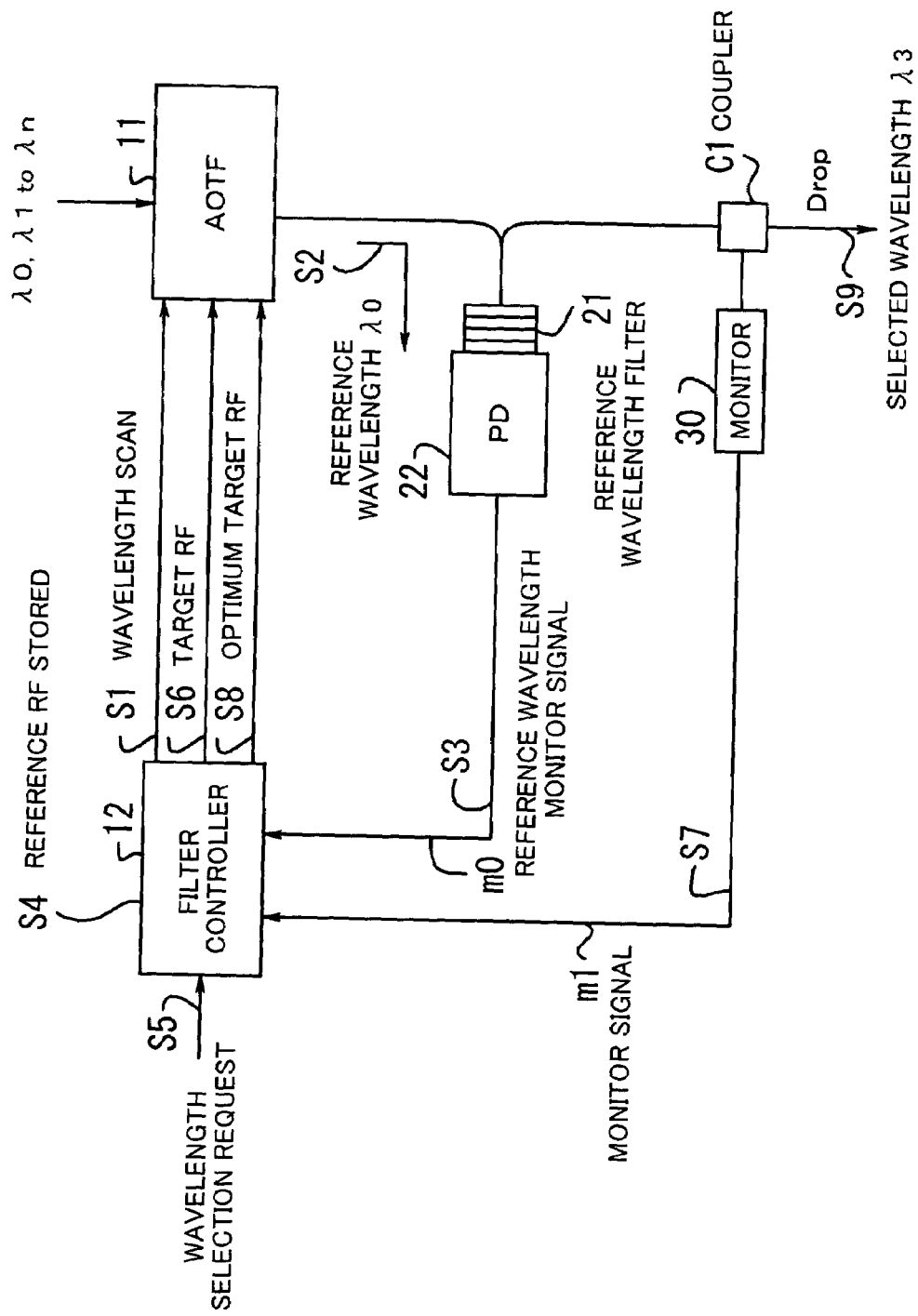
FIG. 7 illustrates the operation of the optical transmission device.

Before explaining in detail the operation according to the present invention (the operation will be described in detail later with reference to FIG. 7 and the following figures), problems to be solved by the present invention, along with conventional wavelength selection using an AOTF, will be explained in detail. First, the configuration and basic operation of an AOTF will be explained.

Figure 2:
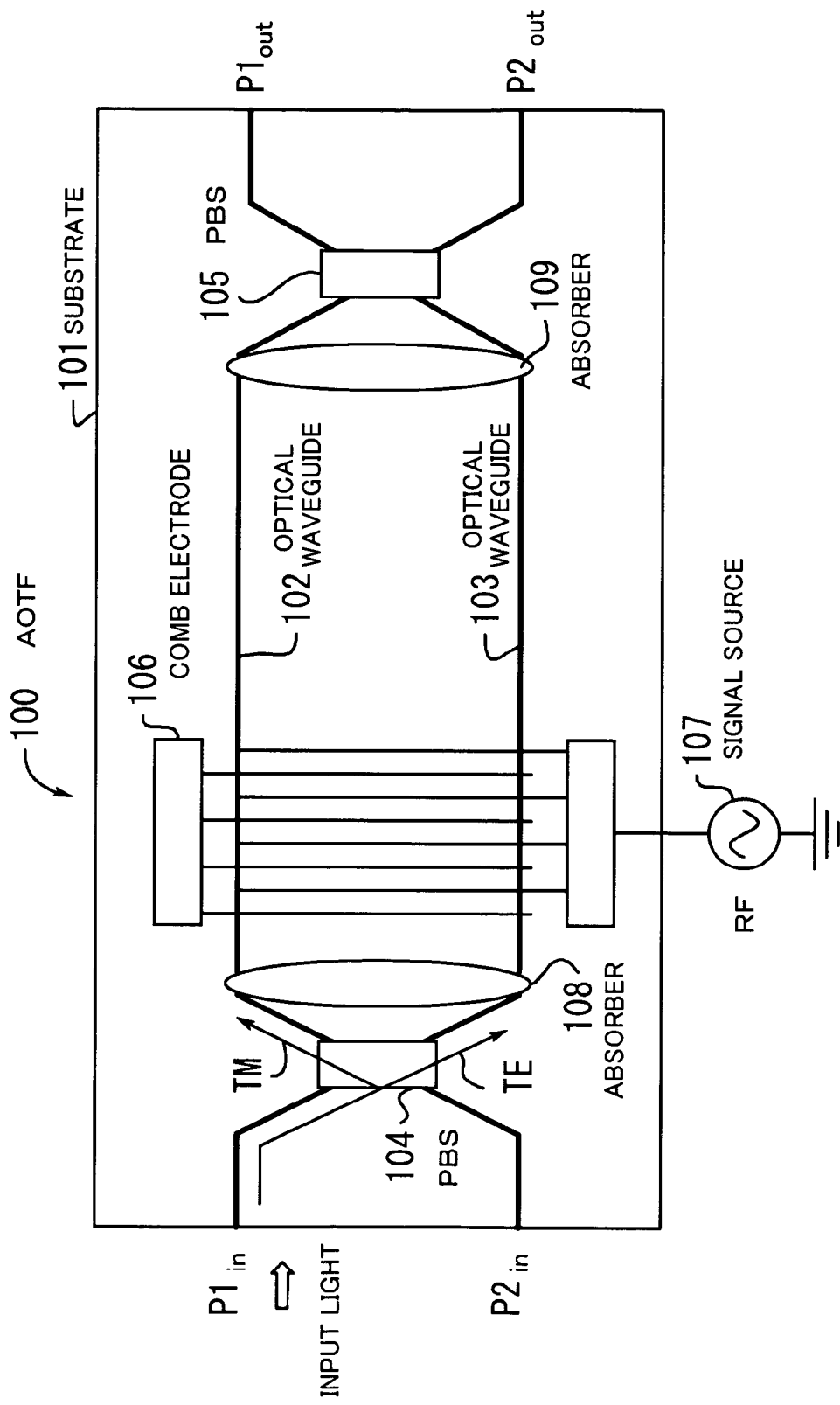
FIG. 2 shows the configuration of an AOTF.

FIG. 2 shows the configuration of an AOTF. The AOTF 100 has optical waveguides 102 and 103 formed on a substrate 101 of piezoelectric crystal (lithium niobate (LiNbO$_3$) etc.) (in the following, LiNbO$_3$ will be referred to as LN (Lithium Niobate)). Ports P1in and P2in are provided at input ends of the optical waveguides 102 and 103, and ports P1out and P2out are provided at output ends of same. The optical waveguides 102 and 103 intersect each other at two points, and polarization beam splitters (PBS) 104 and 105 are provided at the respective intersections.

A comb electrode 106 is formed on the optical waveguides 102 and 103. A signal source 107 generates an RF signal (of about 170 to 180 MHz) and applies the generated signal to the comb electrode 106 to produce a surface acoustic wave (SAW), which causes a change in the refractive index of the optical waveguides 102 and 103.

Let us now consider light input from the port P1in. The input light, in which TE (Transverse Electric) mode and TM (Transverse Magnetic) mode coexist, is separated by the PBS 104 into TE mode light and TM mode light, the TM mode light being propagated through the optical waveguide 102 while the TE mode light being propagated through the optical waveguide 103. The TE mode light (TE polarized light) denotes linearly polarized light of a mode having a horizontal electric field component with respect to the substrate 101, and the TM mode light (TM polarized light) denotes linearly polarized light of a mode having a vertical electric field component with respect to the substrate 101.

The RF signal with a specific frequency is applied to cause the induced surface acoustic wave to act on the optical waveguides 102 and 103, whereupon the refractive index of the optical waveguides 102 and 103 changes, so that among the input light beams, only the beam with a wavelength interacting with the change of the refractive index shows a rotation of polarization. The amount of the rotation is proportional to an interaction length (length of the parallel portions (parallel waveguides) of the optical waveguides 102 and 103) over which the light of individual modes interacts with the change of the refractive index as well as to the power of the RF signal. The interaction length is determined by the interval between absorbers 108 and 109 for absorbing the surface acoustic wave.

Thus, by suitably adjusting the interaction length and the RF signal power, the TM mode light introduced to the optical waveguide 102 is converted to TE mode light and the TM mode light introduced to the optical waveguide 103 is converted to TM mode light. Consequently, the mode-converted light is selected by the PBS 105 and output from the port P2out as selected light, while the light whose mode has not been converted is output from the port P1out as transmitted light. The light input from the port P2in undergoes the same process as described above.

As the frequency of the RF signal is varied, the AOTF 100 can change the optical wavelength to be selected, added or transmitted and thus functions as a wavelength tunable filter (By changing the frequency of the RF signal and thereby varying the wavelength of the surface acoustic wave, it is possible to select the wavelength of light which is subjected to TE/TM mode conversion. Namely, the wavelength of light to be selected, of which the polarization mode rotates, is determined by the frequency of the RF signal). Where a plurality of RF signals with different frequencies are applied to the comb electrode 106, multiple wavelengths can be simultaneously selected.

The following explains the reason why an absolute wavelength cannot be detected with an AOTF and the existing control for wavelength selection using an AOTF. First, a method generally employed for wavelength detection will be explained. To detect a wavelength of light, diffraction and interference are utilized.

Let us consider light beams incident on a diffraction grating. The incident beams turn into spherical waves at gaps of the grating serving as point light sources, are transmitted (or reflected) to be diffracted, and interfere with each other. In the case of vertical incidence (explanation is focused on the vertical incidence for simplicity's sake), the optical path difference $\Delta$ is given by $\Delta = d \cdot \sin\theta$, where $\theta$ is the angle of diffraction and d is the interval between grooves of the diffraction grating.

Light diffracted in a direction satisfying the condition that the optical path difference $\Delta$ is equal to an integer multiple of the wavelength $\lambda$ becomes intense diffracted light because the crests and troughs of light waves overlap each other (the light waves are in phase). Light diffracted in a direction not satisfying the condition becomes weaker than the light diffracted in a direction satisfying the condition, because the crests and troughs of light waves do not overlap (the light waves are out of phase).

The diffraction condition for vertically incident light is given by $d \sin\theta = m \cdot \lambda/n$ ($m = 0, \pm 1, \pm 2, \ldots$), where n is the refractive index of the diffraction grating. When the wavelength of incident light is in phase with that of the diffracted light, the light utilization efficiency (diffraction efficiency) of the diffraction grating is at a maximum, permitting only the light with that wavelength to be extracted. From the above equation of the diffraction condition, it is apparent that the refractive index is a parameter affecting the wavelength selection.

In the AOTF, on the other hand, a surface acoustic wave is introduced to the optical waveguides by the comb electrode driven by the RF signal, to allow the surface acoustic wave to interact with the light. Among the light beams propagated through the optical waveguides, only the beam with a wavelength which is in phase with the wavelength of the surface acoustic wave is selectively subjected to TE/TM mode conversion, so that the wavelength is selected. Also in the AOTF, a specific wavelength is diffracted by the diffraction grating of IN crystal formed in the optical waveguides by the surface acoustic wave, to select the wavelength.

In the case of the AOTF, however, the refractive index of the LN crystal forming the diffraction grating is dependent on temperature. The temperature dependency is as large as about 0.7 nm per 1° C., and this makes it impossible to detect an absolute wavelength.

Figure 3:
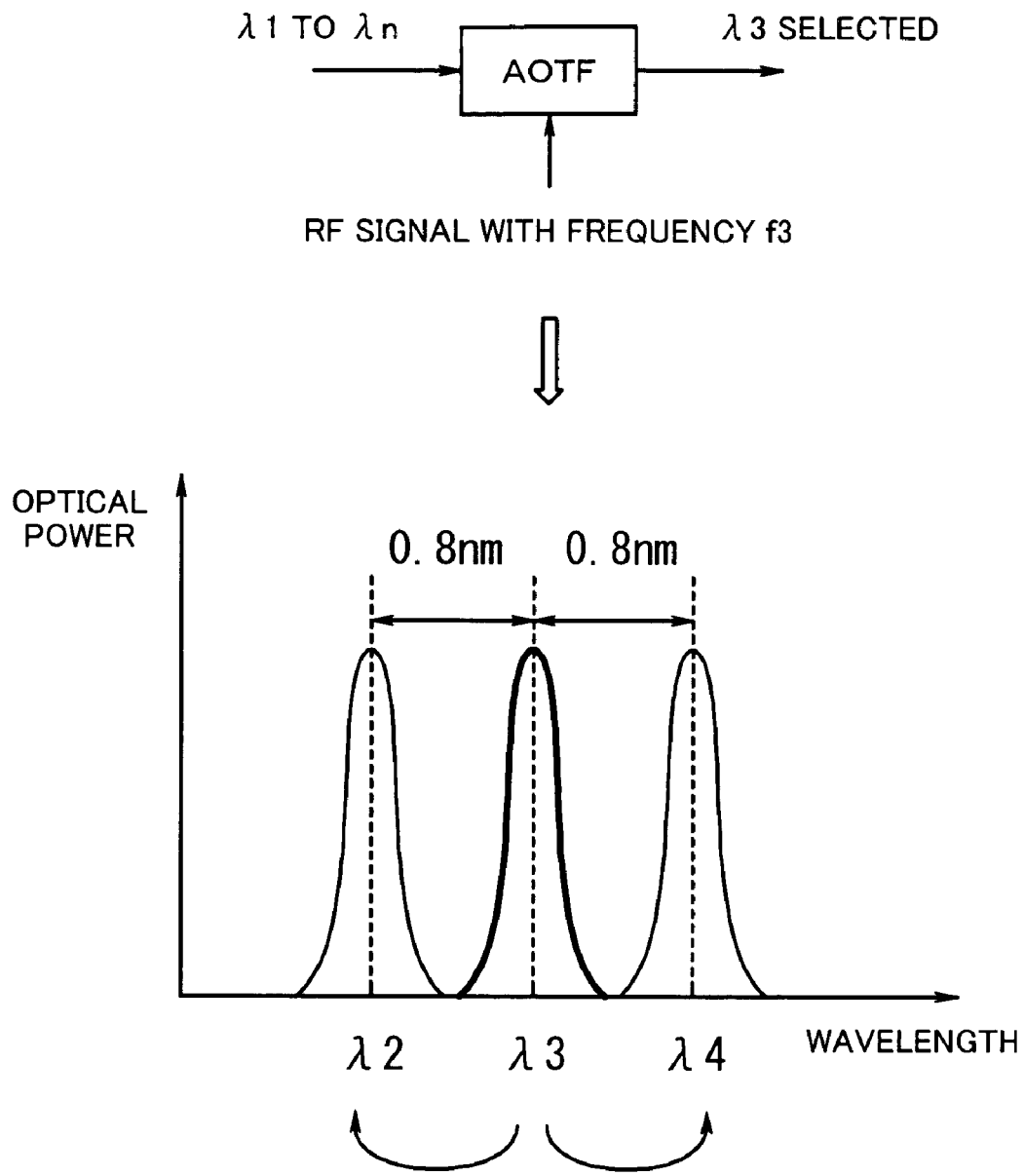
FIG. 3 illustrates fluctuation of a wavelength peak due to temperature dependency of the AOTF.

FIG. 3 illustrates fluctuation of a wavelength peak caused due to the temperature dependency of the AOTF, and in the graph, the vertical axis indicates optical power and the horizontal axis indicates wavelength. Let us consider the case where a wavelength λ3, for example, is filtered out by the AOTF from a WDM signal in which wavelengths (λ1 to λn) are multiplexed with a spacing of 100 GHz (in the vicinity of the wavelength 1550 nm, wavelength channels are separated from each other at intervals of about 0.8 nm).

Provided the frequency of the RF signal for extracting λ3 is f3, the RF signal with the frequency f3 is applied to the AOTF which is input with the WDM signal. In a certain environment, λ3 can be filtered out using the RF signal with the frequency f3, but if the ambient temperature changes by 1° C., then λ4 or λ2 neighboring λ3 can possibly be detected. Namely, the wavelength peak to be filtered out shifts with the ambient temperature and does not assume an absolute position on the wavelength axis, making it impossible to detect an absolute wavelength.

Currently, the wavelength selection by means of the AOTF is carried out in the manner described below. Since, in the AOTF, a wavelength peak to be filtered out does not assume an absolute position, wavelength is scanned with the RF signal on the basis of wavelength information received from a neighboring node, to count the number of peaks and thereby to detect the wavelength.

Figure 4:
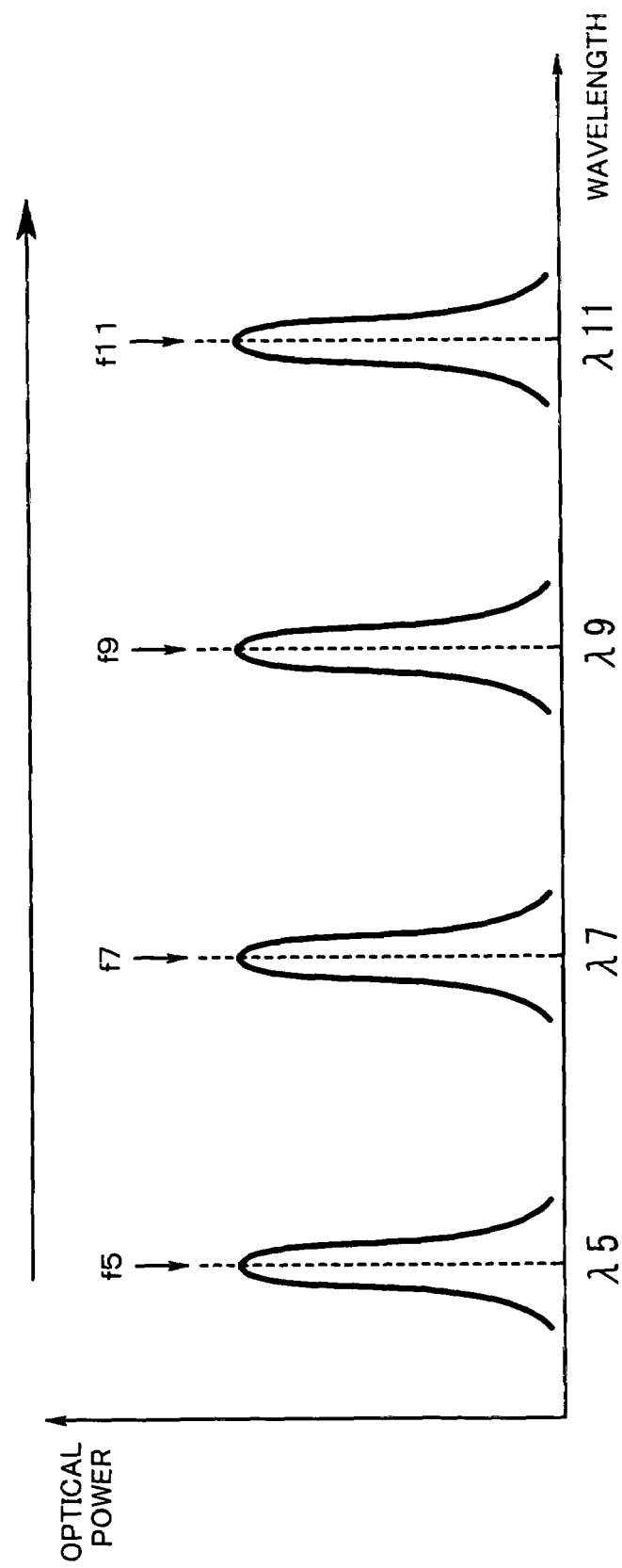
FIG. 4 illustrates conventional wavelength selection by means of the AOTF.

FIG. 4 illustrates the conventional wavelength selection using the AOTF, wherein the vertical axis indicates optical power and the horizontal axis indicates wavelength. It is assumed that the AOTF is receiving four wavelengths λ5, λ7, λ9 and λ11, for example, as a WDM signal.

As the wavelength information, wavelength count information and wavelength channel information are received from a neighboring node. In this case, the wavelength count information indicates "4" as the number of wavelengths and the wavelength channel information indicates channel numbers assigned to λ5, λ7, λ9 and λ11, respectively.

The AOTF scans wavelength while varying the frequency of the RF signal. As a result, the peaks of the wavelengths λ5, λ7, λ9 and λ11 appear in turn along the wavelength axis, showing that there are four wavelength peaks within the entire wavelength scan range (as the frequency of the RF signal is varied, the four peaks successively appear one by one in order of the channel number in such a manner that the wavelength peak λ5 appears when the frequency of the RF signal is at f5, the wavelength peak λ7 appears when the frequency of the RF signal is at f7, and so on).

It is assumed here that λ9 is to be filtered out. Since the wavelength information supplied in advance to the AOTF indicates that the four wavelengths λ5, λ7, λ9 and λ11 are multiplexed in the received signal, the AOTF recognizes that, among the wavelength peaks that appear when wavelength is scanned while varying the frequency of the RF signal, the third wavelength peak corresponds to Namely, when filtering out λ9, wavelength is scanned, then a wavelength peak which is the third peak as counted from the first appearing wavelength peak is identified as a target wavelength, and the frequency of the RF signal at which the third wavelength peak appeared is applied to the AOTF as the RF corresponding to λ9.

Accordingly, even in the case where the refractive index of the IN crystal changes with the ambient temperature, a desired wavelength can be detected. The reason is as follows: A wavelength to be filtered out is identified by counting the wavelength peaks from the first appearing one, and even if the peaks shift due to change in temperature, such a shift does not affect the relative positioning of the wavelength peaks (the third peak always appears in the third position regardless of wavelength fluctuation caused due to temperature change).

Thus, in the wavelength selection currently performed using an AOTF, the number of wavelength peaks is counted based on the wavelength information, to filter out a target wavelength. With this control technique, however, there is a possibility that noise such as side-peaks is erroneously counted as a wavelength signal.

Figure 5:
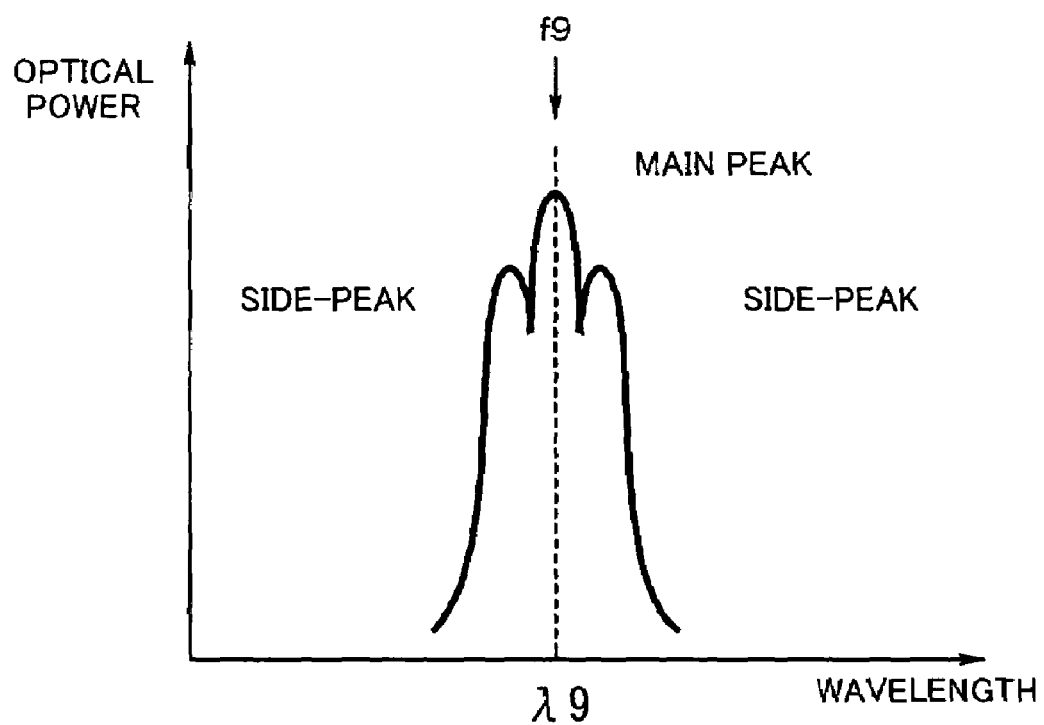
FIG. 5 shows side-peaks.

FIG. 5 shows side-peaks, wherein the vertical axis indicates optical power and the horizontal axis indicates wavelength. When the RF signal for selecting the wavelength λ9, for example, is applied to the AOTF, a wavelength peak appears at the position corresponding to λ9 on the wavelength axis. In this case, the peak actually appears is not a single sharp peak but a broad peak having side-peaks on both sides of the main peak as an axis of symmetry.

Thus, if a side-peak is erroneously counted as a substantial peak when the number of wavelength peaks is counted, the wavelength that should originally be selected fails to be located. As a result, connection fails to be established with a target node and instead is established with a node different from the target node because of the erroneously selected wavelength, causing a communication fault.

Also, in the conventional wavelength selection using an AOTF, it is necessary that, in addition to the wavelength selection request, the wavelength information which includes wavelength channel numbers, wavelength count, etc. as information about the optical signal currently transmitted should be transmitted from a higher layer to individual nodes, giving rise to a problem that the nodes themselves are unable to select wavelengths, which lowers control efficiency.

Further, even though the wavelength information is supplied from a node, each node does not have a direct monitoring function which permits a Drop wavelength actually dropped by the AOTF to be directly monitored to identify the corresponding wavelength channel (Drop section has no wavelength monitoring mechanism).

According to the present invention, the problems with the conventional wavelength selection using an AOTF can be solved and the quality and reliability of the OADM function can be improved to permit a highly flexible, economical OADM network to be configured (the present invention also eliminates the aforementioned drawbacks with the conventional optical continuity test and the drawback arising from lack of a wavelength monitoring mechanism in the Add section).

Figure 6:
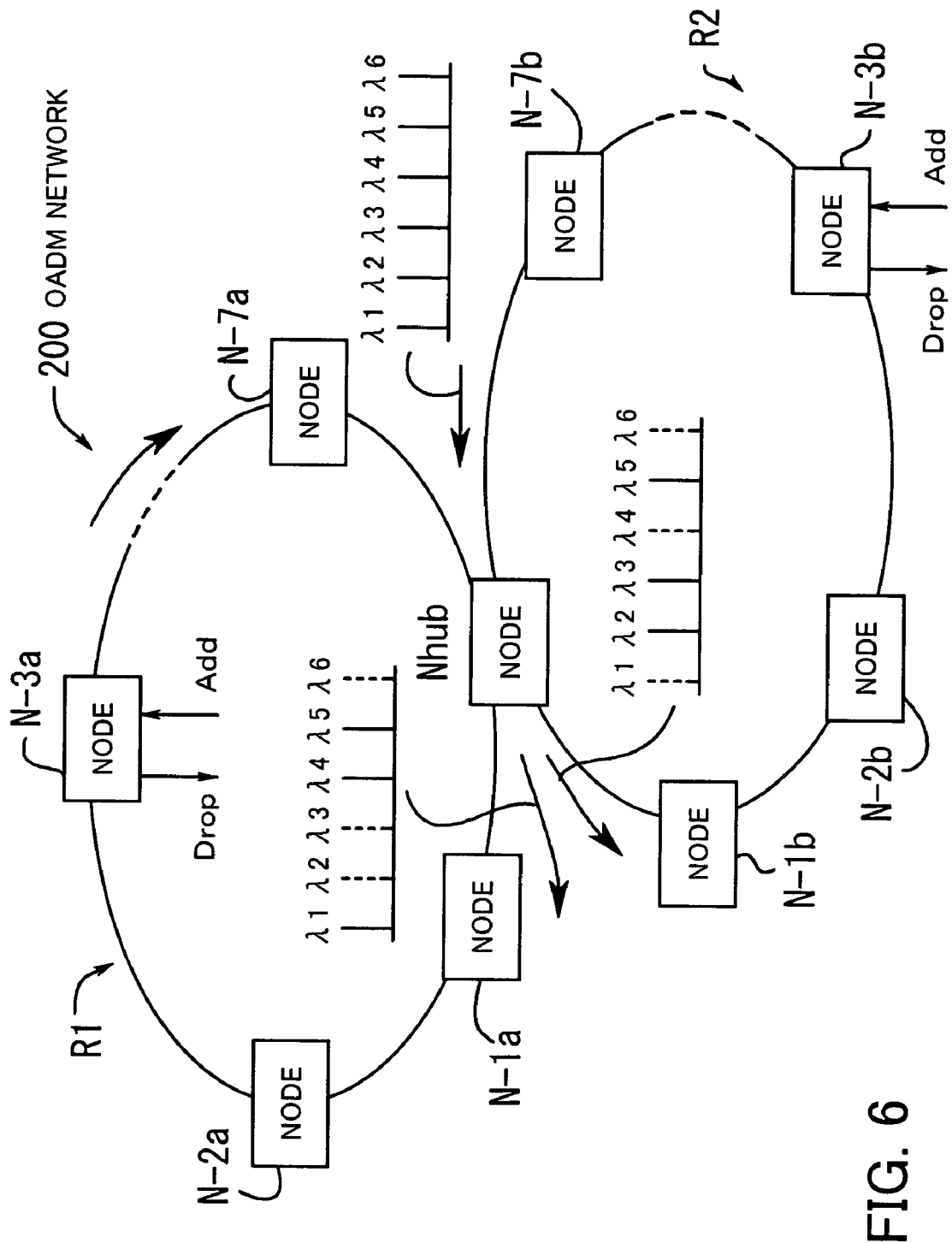
FIG. 6 schematically shows OADM ring networks.

An OADM network to which the optical transmission device 1 of the present invention is applied will be now described. FIG. 6 schematically shows an OADM network. The OADM network 200 is constituted by OADM ring networks R1 and R2 which are interconnected by a node Nhub.

The OADM ring network R1 includes the node Nhub and nodes N-1a to N-7a connected in ring form, and the OADM ring network R2 includes the node Nhub and nodes N-1b to N-7b connected in ring form (each node is provided with the optical transmission device 1).

Each node in the network has the OADM function whereby an optical signal of specified wavelength, among those multiplexed in a WDM signal, is dropped (Drop) from the network to a tributary, or an optical signal of specified wavelength is added (Add) to the network from the tributary, or the WDM signal is passed through to a neighboring node without the addition or dropping of an optical signal.

Also, the node Nhub has an optical hub function and is capable of exchanging all wavelengths transmitted through the OADM ring networks R1 and R2. Specifically, the node Nhub can switch optical signals of identical wavelength band between the OADM ring networks R1 and R2 and also can remove only a certain wavelength from the information to be transmitted to next nodes.

For example, the node Nhub receives a WDM signal with wavelengths $\lambda 1$ to $\lambda 6$, as illustrated. For the OADM ring network R1, the wavelengths $\lambda 2$, $\lambda 3$ and $\lambda 6$ are removed and the remaining wavelengths $\lambda 1$, $\lambda 4$ and $\lambda 5$ are transmitted to the node N-1$a$. For the OADM ring network R2, the wavelengths $\lambda 1$, $\lambda 4$ and $\lambda 6$ are removed and the remaining wavelengths $\lambda 2$, $\lambda 3$ and $\lambda 5$ are transmitted to the node N-1$b$.

Operation of the optical transmission device 1 of the present invention will be now described. FIG. 7 illustrates the operation of the optical transmission device 1. The AOTF 11 is input with a WDM signal in which a reference wavelength $\lambda 0$ and wavelengths $\lambda 1$ to $\lambda n$ are multiplexed, and selects a certain wavelength (in this instance, $\lambda 3$) from the WDM signal. Steps S1 to S4 explained below are a wavelength matching operation (control for obtaining a reference RF which causes the AOTF 11 to pass the reference wavelength $\lambda 0$ therethrough), and Steps S5 to S9 are an operation for selecting a target wavelength.

[S1] The filter controller 12 applies the RF signal to the AOTF 11 while scanning wavelength over an entire signal bandwidth (wavelength band from $\lambda 1$ to $\lambda n$).

[S2] Since wavelength is scanned with the RF signal over the entire signal bandwidth, the reference wavelength $\lambda 0$ passes once through the AOTF 11. The reference wavelength $\lambda 0$ output from the AOTF 11 at this time passes through the reference wavelength filter 21 and is input to the PD 22. The reference wavelength filter 21 passes only the reference wavelength (in this instance, $\lambda 0$) therethrough and reflects the other wavelengths so as not to be input to the PD 22.

[S3] The PD 22 converts the reference wavelength $\lambda 0$ to electricity to generate a reference wavelength monitor signal m0 indicative of the optical power of the reference wavelength $\lambda 0$, and sends the generated signal to the filter controller 12.

[S4] On detecting the reference wavelength monitor signal m0, the filter controller 12 stores the then-applied frequency of the RF signal as the reference RF. When detecting the reference wavelength monitor signal m0, a peak, or maximum level, of the output signal from the PD 22 is detected (where the PD 22 shows a negative value when activated, a minimum extreme level of the output signal from the PD is detected).

[S5] The filter controller 12 receives a wavelength selection request from a higher layer. In this instance, the wavelength selection request demands that the wavelength $\lambda 3$ be selected.

[S6] The filter controller 12 obtains a target RF corresponding to the wavelength $\lambda 3$ to be selected, based on a relative position of the target wavelength $\lambda 3$ with respect to the reference wavelength $\lambda 0$ and the reference RF, and applies the target RF to the AOTF 11.

[S7] The monitor 30 monitors, through the coupler C1, the power of the optical signal output from the AOTF 11 to generate a monitor signal m1, and sends the generated signal to the filter controller 12.

[S8] Based on the monitor signal m1, the filter controller 12 applies the RF signal to the AOTF 11 while varying the frequency thereof in the vicinity of the target RF, to detect a maximum peak level (or minimum extreme level) of the monitor signal m1, and sets the frequency applied when the maximum peak level (or minimum extreme level) is detected, as an optimum target RF.

The target RF obtained in Step S6 sometimes contains an error. Step S8 is therefore executed to remove such an error. Namely, while monitoring the monitor signal m1, the RF signal is applied to the AOTF 11 with the frequency thereof varied in the vicinity of the target RF, to detect a maximum value of the monitor signal m1 and thereby determine an optimum (accurate) target RF.

[S9] The AOTF 11 selects, from the WDM signal, the wavelength $\lambda 3$ corresponding to the optimum target RF applied from the filter controller 12, by allowing the selected wavelength to pass therethrough. The signal with the wavelength $\lambda 3$ is dropped through the coupler C1.

Figure 8:
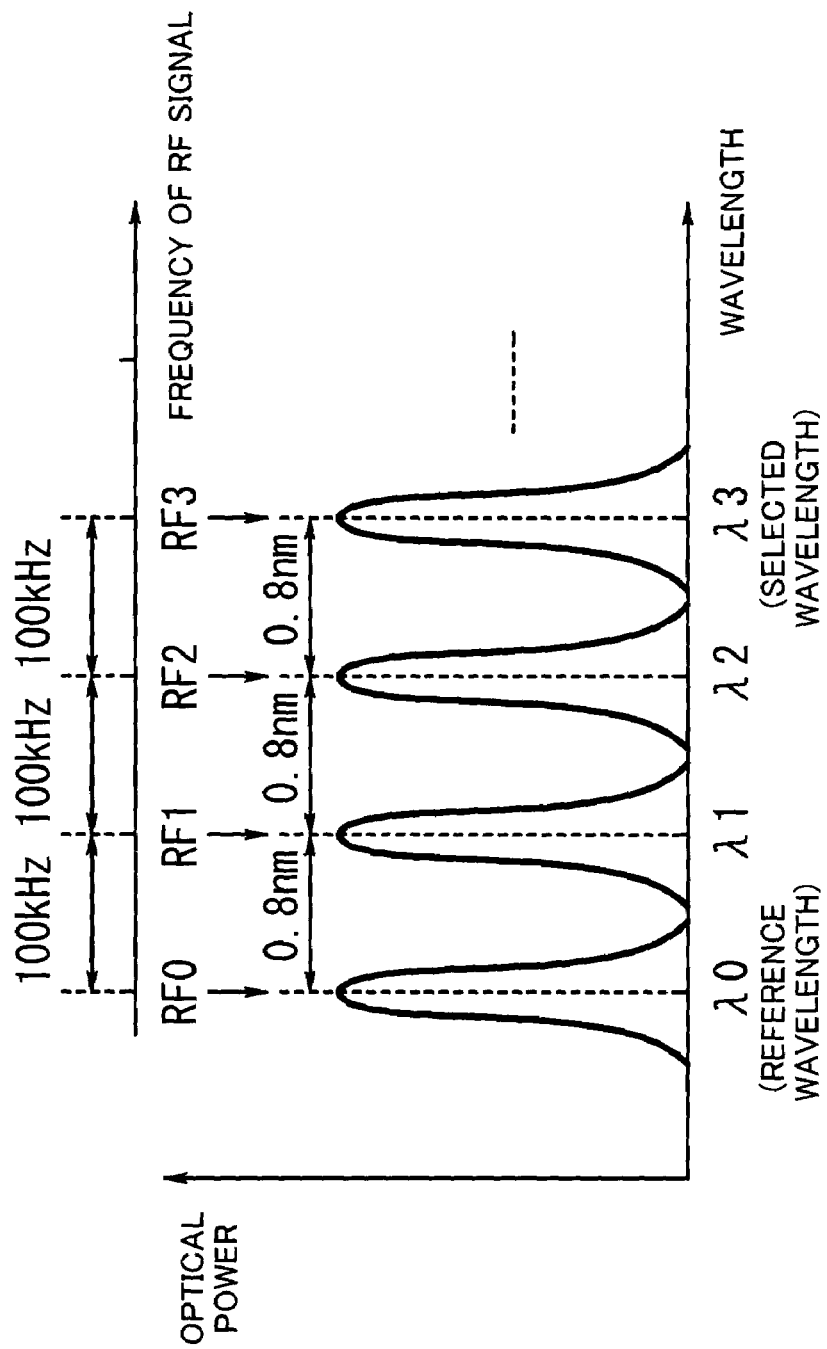
FIG. 8 illustrates a method of obtaining a target RF.

The following describes the manner of how the target RF is obtained in the aforementioned Step S6. FIG. 8 illustrates how the target RF is obtained. First, the filter controller 12 applies the RF signal to the AOTF 11 while scanning wavelength over the entire signal bandwidth, to detect a reference RF (in this instance, RF0) corresponding to the reference wavelength $\lambda 0$.

Once RF0 corresponding to the reference wavelength $\lambda 0$ is found, RF1 corresponding to $\lambda 1$, RF2 corresponding to $\lambda 2$, etc. can be obtained from RF0, since the relative positioning of wavelength peaks to be selected with respect to the wavelength peak $\lambda 0$ is fixed. If $\lambda 3$ is the wavelength to be selected, the position of $\lambda 3$ is derived based on $\lambda 0$ and the RF corresponding to this wavelength position is used as the target RF.

Let us suppose that, in a WDM signal in which wavelengths $\lambda 1$ to $\lambda n$ are multiplexed with a spacing of 100 GHz (corresponding to an interval of about 0.8 nm in the vicinity of the wavelength 1550 nm), the reference wavelength $\lambda 0$ is spaced from $\lambda 1$ to the left thereof by 0.8 nm. Further, let it be assumed that after detecting RF0 corresponding to the reference wavelength $\lambda 0$, the filter controller 12 receives a wavelength selection request for $\lambda 3$.

To move to a neighboring wavelength spaced by 100 GHz, the frequency of the RF signal needs to be varied by about 100 kHz. Accordingly, to select $\lambda 3$ based on the reference wavelength $\lambda 0$, the frequency of the RF signal needs to be varied from RF0 by 300 kHz (=100 kHz×3), and therefore, RF3=RF0+300 kHz. In practice, the obtained frequency contains an error, and therefore, according to the present invention, the aforementioned Step S8 is executed to obtain an accurate RF (optimum target RF).

Even in the case where the optimum target RF obtained based on the reference RF0 is applied to the AOTF 11 for wavelength selection, the first obtained reference RF0 itself varies if the ambient temperature changes. To eliminate such inconvenience, the filter controller 12 has a temperature sensor therein, and when a temperature change is detected, the controller again scans wavelength for wavelength matching and acquires a new reference RF. Then, the filter controller again obtains an optimum target RF and applies the obtained RF to the AOTF 11.

According to the present invention, the wavelength selection by the AOTF 11 is controlled in the aforementioned manner, whereby a wavelength can be selected with high accuracy. Unlike the conventional device, the number of peaks is not counted, and therefore, erroneous wavelength selection attributable to erroneous counting of peaks does not occur. Further, the wavelength information is unnecessary and each node can select a wavelength by itself, making it possible to improve control efficiency.

The configuration of a node provided with a reference wavelength light source will be now described. The reference wavelength light source for emitting the reference wavelength $\lambda 0$ is arranged immediately in front of the input side of the AOTF 11 or in a position where the reference wavelength $\lambda 0$ can be propagated throughout the OADM ring network.

Figure 9:
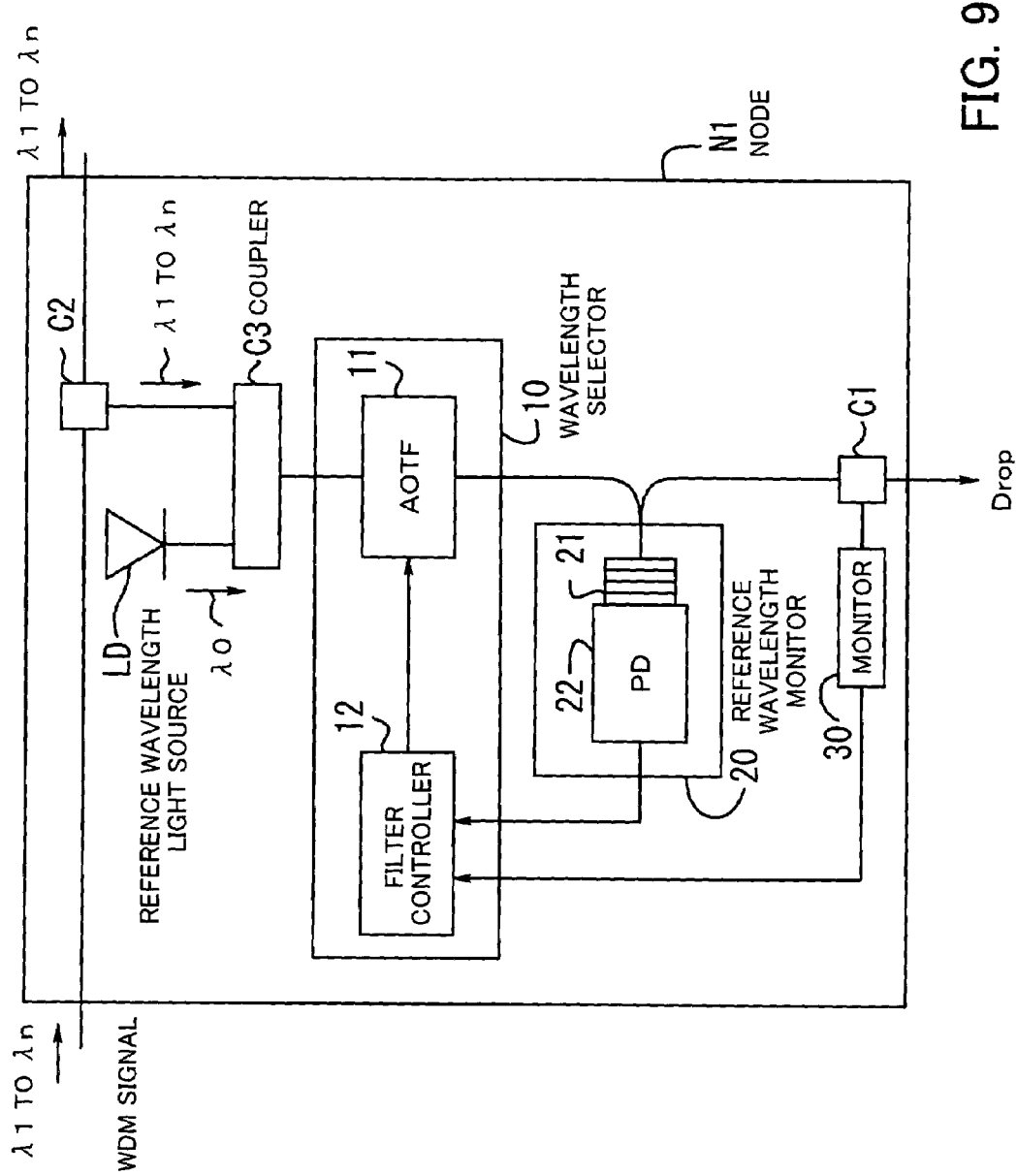
FIG. 9 shows a node in which a reference wavelength light source is arranged immediately in front of an AOTF.

FIG. 9 shows a node in which the reference wavelength light source is arranged immediately in front of the input side of the AOTF 11. The node N1 includes couplers C2 and C3 and the reference wavelength light source LD, besides the elements shown in FIG. 1. The coupler C2 splits a WDM signal received from the network into two, one being sent to the coupler C3 while the other being transmitted to a neighboring node.

The coupler C3 is a coupler with two inputs and one output and is arranged in an input stage immediately preceding the AOTF 11. The coupler C3 has one input line connected with the reference wavelength light source LD for emitting the reference wavelength $\lambda 0$, and has the other input line input with the WDM signal in which wavelengths $\lambda 1$ to $\lambda n$ are multiplexed. Where the nodes constituting an OADM ring network are configured in this manner, each node can select a wavelength by means of the AOTF 11.

Figure 10:
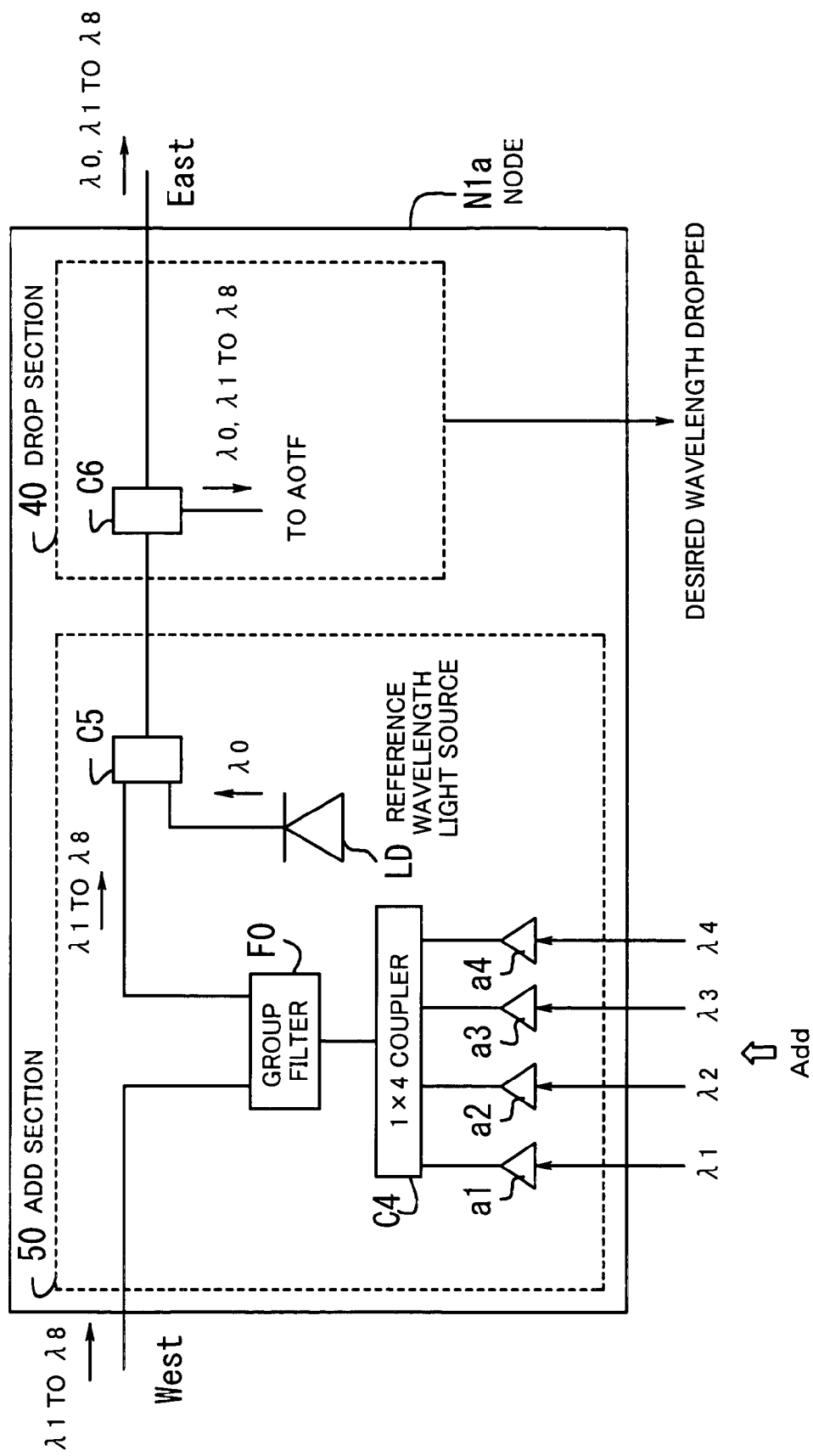
FIG. 10 shows a node in which the reference wavelength light source is arranged in an Add section.

FIG. 10 shows a node in which the reference wavelength light source LD is arranged at a wavelength addition (Add) side. The node N1a has an Add section 50 and a Drop section 40, and the Add section 50 includes amplifiers a1 to a4, a 1×4 coupler C4, a group filter F0, the reference wavelength light source LD, and a coupler C5. In the Drop section 40 is arranged the optical transmission device 1 (not shown) to which a WDM signal split by a coupler C6 is supplied.

The amplifiers a1 to a4 of the Add section 50 receive and amplify Add wavelength signals $\lambda 1$ to $\lambda 4$ to be added, respectively, and output the amplified wavelength signals to the coupler C4. The coupler C4 multiplexes the amplified wavelength signals $\lambda 1$ to $\lambda 4$ and outputs the result to the group filter F0.

The group filter F0 receives a WDM signal with wavelengths $\lambda 1$ to $\lambda 8$ from the West side of the network, as well as the multiplexed signal with wavelengths $\lambda 1$ to $\lambda 4$ from the coupler C4. At this time, the group filter rejects the wavelengths $\lambda 1$ to $\lambda 4$ input from the West side of the network and passes the remaining wavelengths $\lambda 5$ to $\lambda 8$ and the added wavelengths $\lambda 1$ to $\lambda 4$ therethrough, whereby the resultant multiplexed signal with wavelengths $\lambda 1$ to $\lambda 8$ is output (old wavelengths $\lambda 1$ to $\lambda 4$ circulated through the ring network are replaced with the new Add wavelengths $\lambda 1$ to $\lambda 4$).

The coupler C5 multiplexes the reference wavelength $\lambda 0$ emitted from the reference wavelength light source LD arranged in the Add section 50 with the WDM signal with wavelengths $\lambda 1$ to $\lambda 8$ output from the group filter F0, and sends the resultant multiplexed signal with wavelengths $\lambda 0$ and $\lambda 1$ to $\lambda 8$ to the Drop section 40. The coupler C6 splits the signal with wavelengths $\lambda 0$ to $\lambda 8$ to be directed to the AOTF side as well as to the network side. The AOTF performs the aforementioned wavelength selection to drop a predetermined wavelength. The signal directed to the network side is transmitted to the neighboring node on the East side.

Thus, by arranging the reference wavelength light source LD in the Add section 50 of a node, it is possible to make the reference wavelength $\lambda 0$ propagated throughout the OADM ring network, permitting each node to select a wavelength based on the reference wavelength $\lambda 0$ by using the AOTF.

In the configurations shown in FIGS. 9 and 10, the reference wavelength light source LD is provided to emit the reference wavelength $\lambda 0$. The reference wavelength light source LD may be omitted and one of the wavelengths multiplexed in the main optical WDM signal may be used as the reference wavelength. In the configuration of FIG. 10, for example, the Add wavelength $\lambda 2$ may be used as the reference wavelength. In this case, however, a filter capable of passing only the wavelength $\lambda 2$ therethrough and reflecting the other wavelengths needs to be used for the reference wavelength filter 21 (a node using Add signals as the reference wavelengths will be described later with reference to FIGS. 19 and 20).

Figure 11:
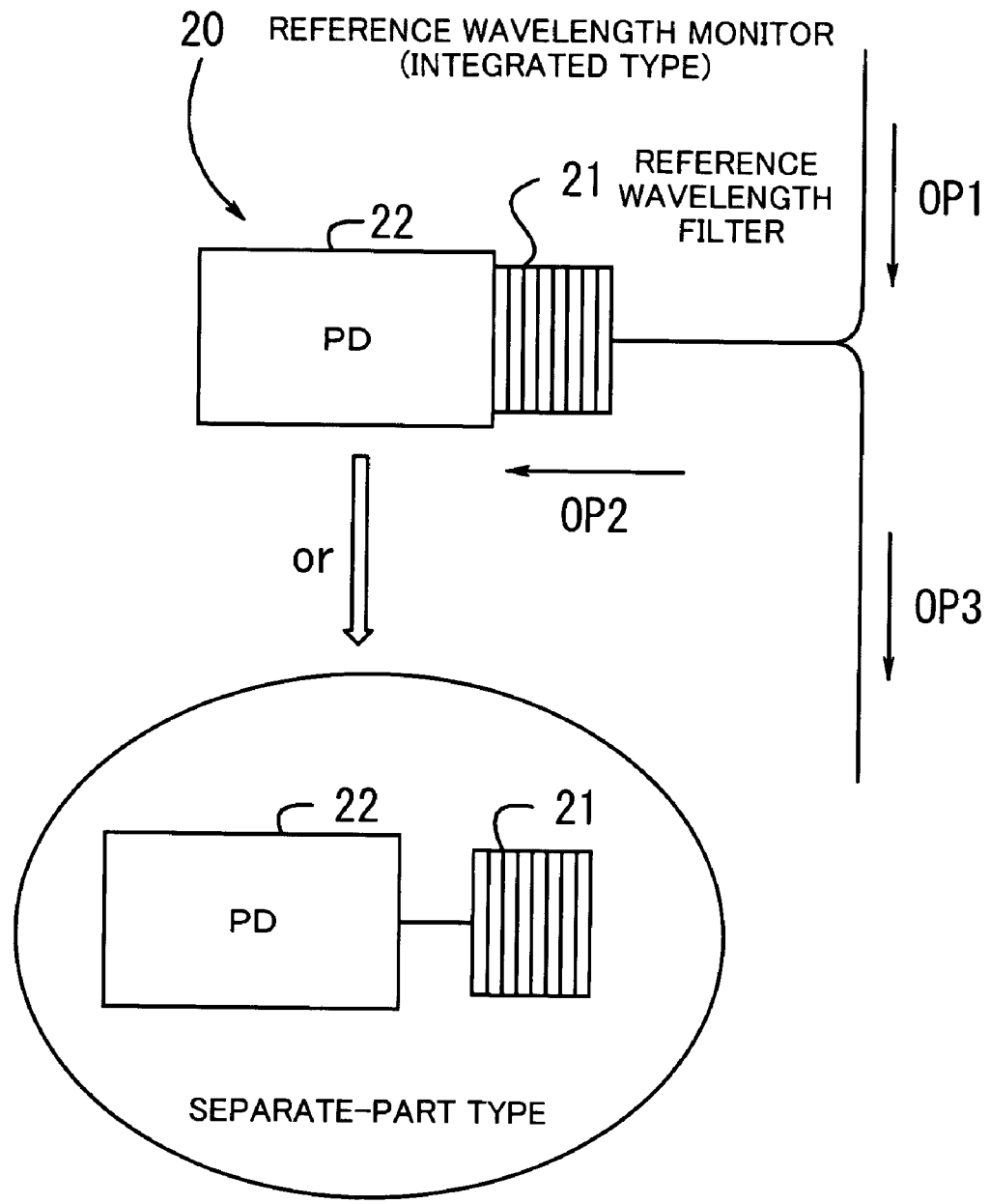
FIG. 11 shows a reference wavelength monitor.

The reference wavelength monitor 20 will be now described with reference to FIG. 11. The reference wavelength monitor 20 is a wavelength filter-combined PD in which the reference wavelength filter 21 and the PD 22 are integrated. The dependency of transmission wavelength of the wavelength filter-combined PD on temperature is as small as about 0.1 nm with respect to a change of 100° C. Also, the wavelength filter-combined PD is low in cost and small in size (25×4×4 mm). In the following description, light input to the reference wavelength filter 21, light transmitted through the filter 21 and light reflected by the filter 21 are denoted by OP1, OP2 and OP3, respectively.

Instead of constituting the reference wavelength monitor 20 by a wavelength filter-combined PD in which the reference wavelength filter 21 and the PD 22 are integrated, the reference wavelength filter 21 and the PD 22, as separate parts, may be connected to each other.

Figure 12:
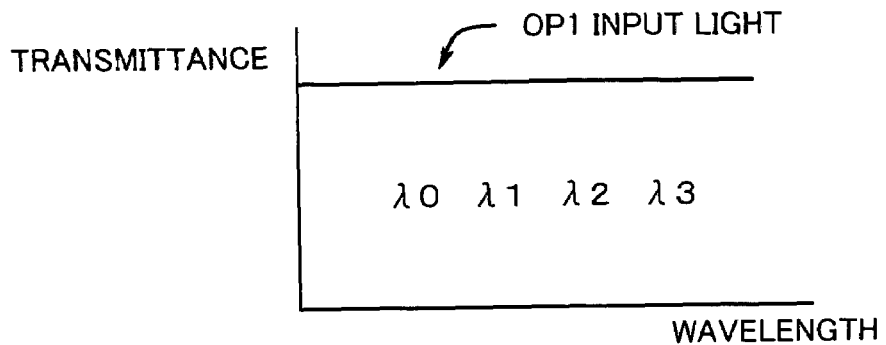
Figure 12:
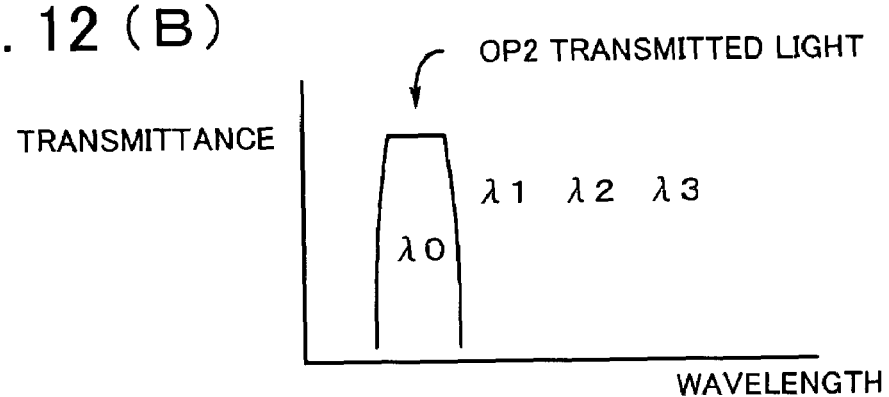
Figure 12:
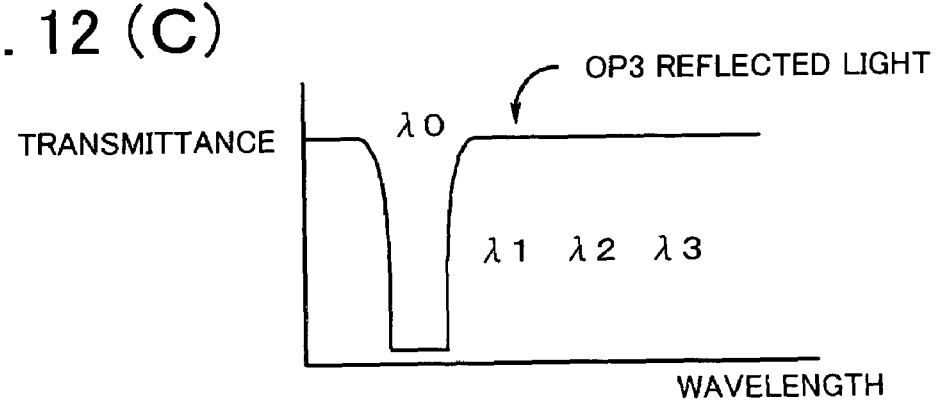

FIG. 12 illustrates the characteristic of the reference wavelength filter 21, wherein the reference wavelength filter 21 is of a full-cut type which cuts off the reference wavelength $\lambda 0$ in its entirety. FIG. 12(A) shows the input light OP1, FIG. 12(B) shows the transmitted light OP2, and FIG. 12(C) shows the reflected light OP3. In each figure, the vertical axis indicates transmittance (dB) and the horizontal axis indicates wavelength. Also, the input light OP1 is an optical signal in which wavelengths $\lambda 0$ to $\lambda 3$ are multiplexed.

The reference wavelength filter 21 cuts off the reference wavelength $\lambda 0$ in its entirety, and accordingly, the transmitted light contains only the wavelength $\lambda 0$, as shown in FIG. 12(B). Since only the wavelength $\lambda 0$ is cut off in its entirety from the input light with wavelengths $\lambda 0$ to $\lambda 3$, the remaining wavelengths are reflected, as shown in FIG. 12(C).

Figure 13:
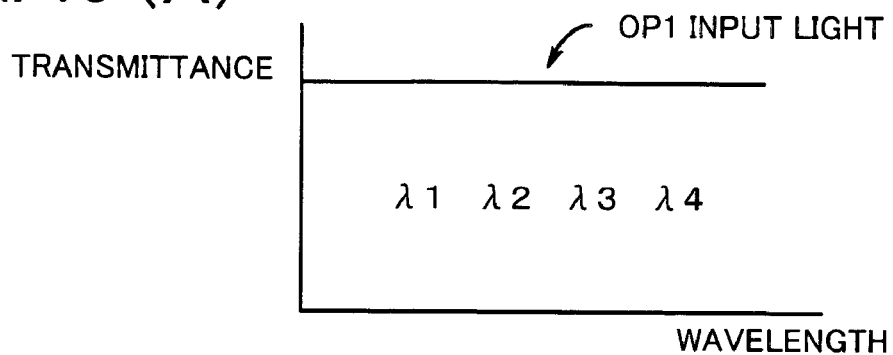
Figure 13:
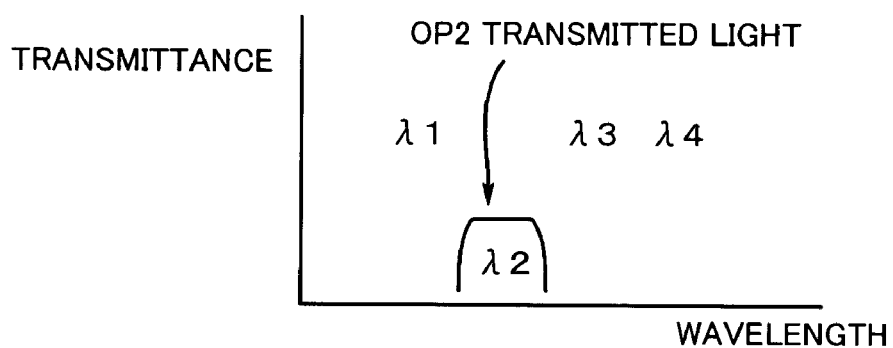
Figure 13:
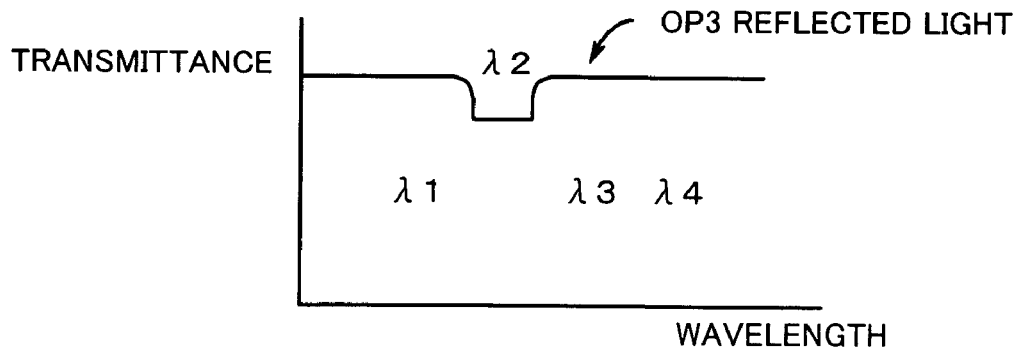

FIG. 13 also illustrates the characteristic of the reference wavelength filter 21, wherein the reference wavelength filter 21 is of a partial-cut type which partially cuts off the wavelength $\lambda 2$ as the reference wavelength. FIG. 13(A) shows the input light OP1, FIG. 13(B) shows the transmitted light OP2, and FIG. 13(C) shows the reflected light OP3. In each figure, the vertical axis indicates transmittance (dB) and the horizontal axis indicates wavelength. The input light OP1 is an optical signal in which wavelengths $\lambda 1$ to $\lambda 4$ are multiplexed.

The reference wavelength filter 21 partially cuts off the reference wavelength $\lambda 2$, and therefore, the wavelength $\lambda 2$ is partially transmitted through the filter, as shown in FIG. 13(B). Since the wavelength $\lambda 2$ among the wavelengths $\lambda 1$ to $\lambda 4$ is partially cut off by the filter, the input light is reflected from the filter in the manner shown in FIG. 13(C).

Where the main optical signal is a WDM signal in which wavelengths $\lambda 1$ to $\lambda n$ are multiplexed and the reference wavelength used has a wavelength (e.g., $\lambda 0$) other than the wavelengths $\lambda 1$ to $\lambda n$ (i.e., in the case of using the reference wavelength light source LD), a full-cut filter having the characteristic shown in FIG. 12 is used for the reference wavelength filter 21 so that the wavelength $\lambda 0$ may not be dropped.

On the other hand, where a wavelength (e.g., $\lambda 2$) among the wavelengths $\lambda 1$ to $\lambda n$ is used as the reference wavelength, a partial-cut filter having the characteristic shown in FIG. 13 is used for the reference wavelength filter 21 so that the wavelength $\lambda 2$ also can be dropped.

A modification of the reference wavelength monitor 20 will be now described with reference to FIG. 14. An optical transmission device 1*a* includes the AOTF 11, the filter controller 12, a reference wavelength monitor 20*a*, the monitor 30, and the couplers C1 and C7. The aforementioned reference wavelength filter 21 passes the reference wavelength λ0 therethrough and reflects other wavelengths than λ0. According to the modification, the reference wavelength filter 21 is replaced by a one-wavelength filter 23 for passing the wavelength λ0 therethrough. Also, the coupler C7, which is a 1×2 coupler, is arranged at the output stage of the AOTF 11.

The coupler C7 splits the output of the AOTF 11 into two identical signals. One of the split signals is input to the one-wavelength filter 23, which then passes only the reference wavelength λ0 therethrough. The other split signal is input to the coupler C1. With this configuration, the reference wavelength λ0 can be detected and monitored.

Figure 15:
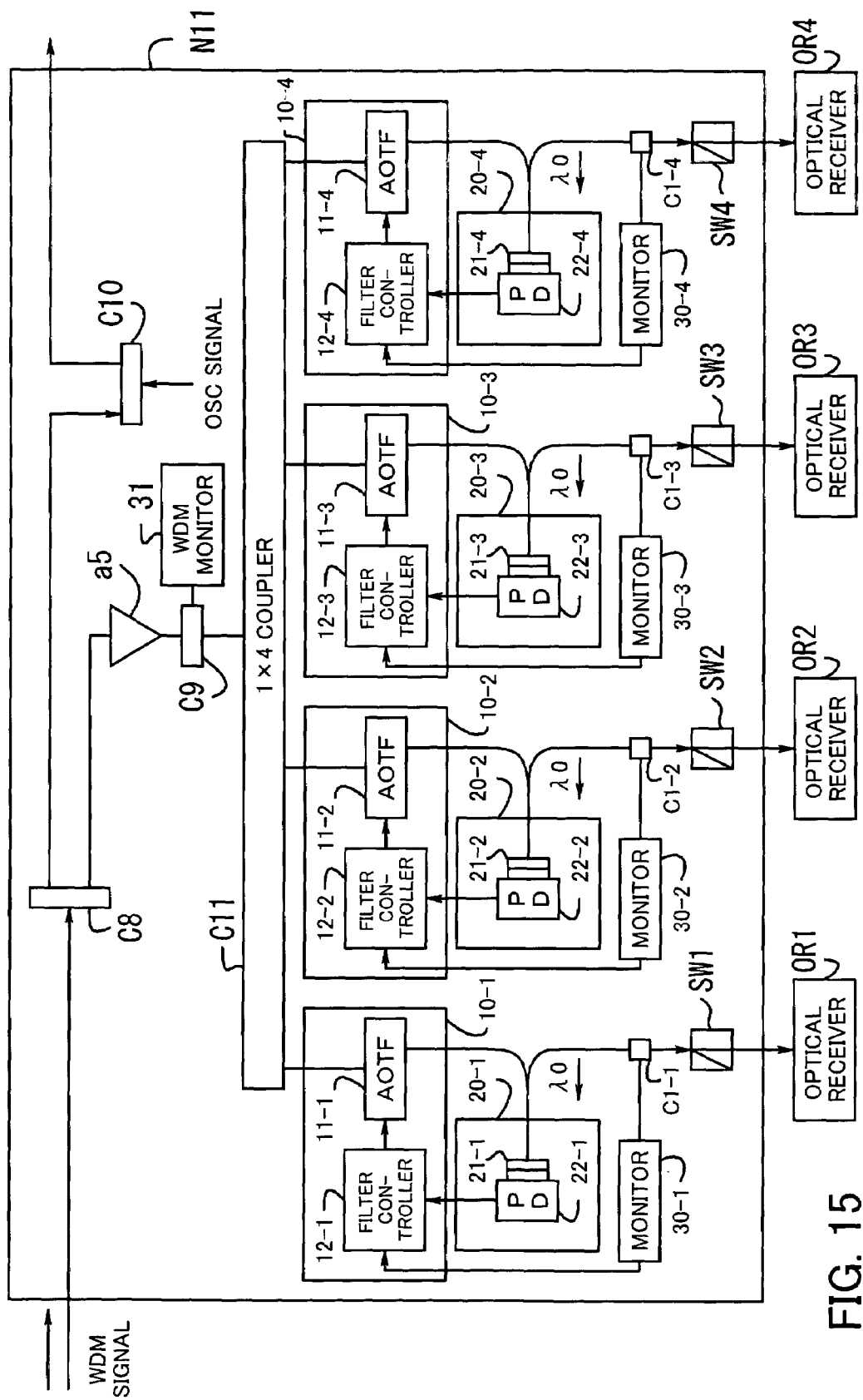
FIG. 15 shows the configuration of a node.

The following describes the configuration and operation of a node having a function whereby wavelengths other than Drop wavelengths to be dropped are prevented from being dropped (other wavelengths than the Drop wavelengths are never erroneously dropped). FIG. 15 shows the configuration of the Drop section of such a node N11. Optical receivers OR1 to OR4 are arranged on the tributary side of the node N11 to receive predetermined wavelengths dropped by the node.

An input WDM signal is split by a coupler C8 into two, one being input to a coupler C10 while the other being input a WDM amplifier a5. The coupler C10 multiplexes the WDM signal with an OSC (Optical Supervisory Channel) signal, which is a supervisory signal containing operation information etc., and transmits the multiplexed signal to a neighboring node.

The WDM amplifier a5 amplifies the WDM signal, and the amplified signal output from the amplifier is split by a coupler C9 into two, one being input to a WDM monitor 31 while the other being input to a 1×4 coupler C11. The WDM monitor 31 monitors the WDM signal, and the 1×4 coupler C11 splits the WDM signal into four identical WDM signals, which are output to respective wavelength selectors 10-1 to 10-4.

The 1×4 coupler C11 has four output lines to which the respective wavelength selectors 10-1 to 10-4 are connected. The wavelength selectors 10-1 to 10-4 include AOTFs 11-1 to 11-4, respectively, the outputs of which are connected to reference wavelength monitors 20-1 to 20-4 and couplers C1-1 to C1-4, respectively.

The couplers C1-1 to C1-4 each have one branch line connected to a corresponding one of monitors 30-1 to 30-4 and the other branch line connected to a corresponding one of switches SW1 to SW4. Monitor signals from the reference wavelength monitors 20-1 to 20-4 and those from the monitors 30-1 to 30-4 are fed back to the respective filter controllers 12-1 to 12-4. The switches SW1 to SW4 are connected to the optical receivers OR1 to OR4, respectively.

In the node N11 configured as above, the ON/OFF switches SW1 to SW4 are connected to output signal lines of the respective AOTFs 11-1 to 11-4, and while the wavelength scan is performed in any of the AOTFs 11-1 to 11-4, the corresponding one of the switches SW1 to SW4 is turned OFF so that signals other than the set wavelength may not be dropped to the corresponding one of the optical receivers OR1 to OR4.

Figure 16:
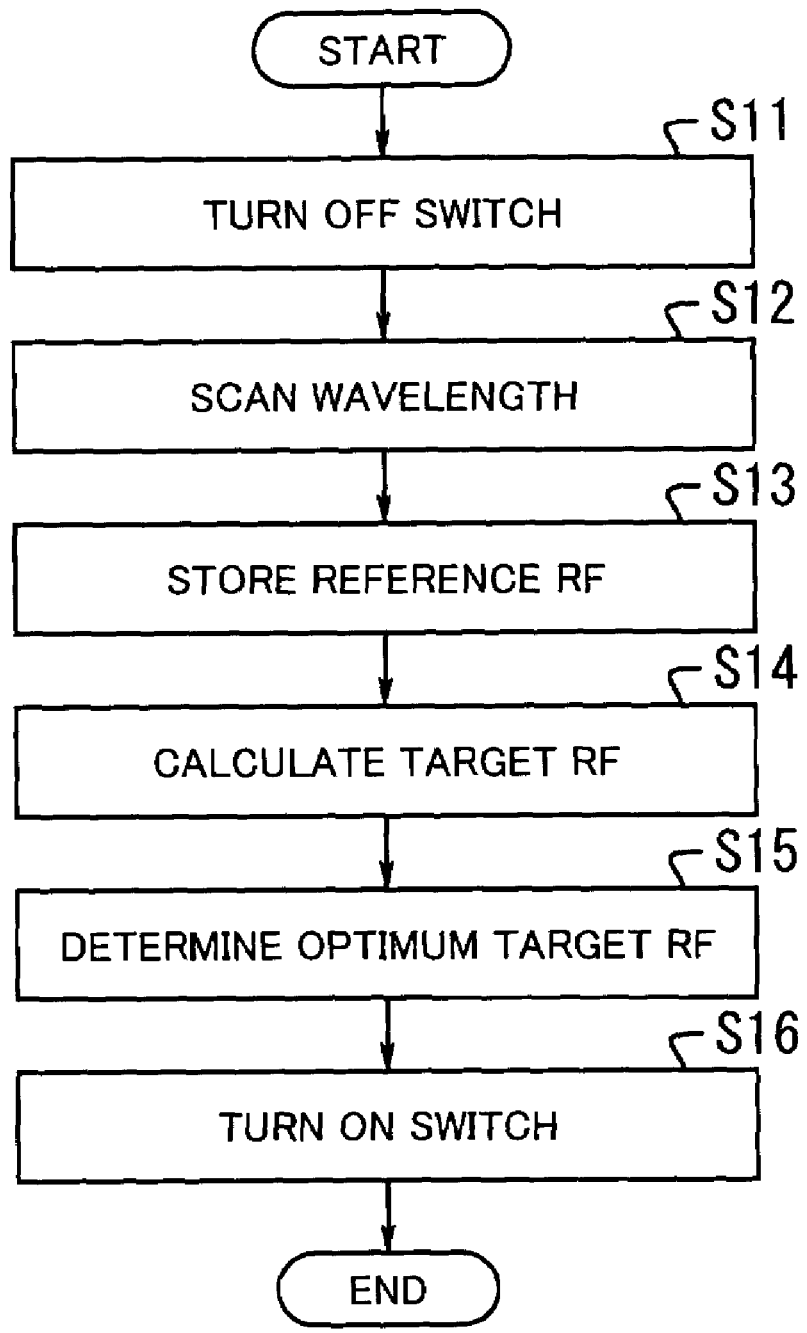
FIG. 16 is a flowchart illustrating the operation of the node.

FIG. 16 is a flowchart illustrating the operation of the node N11. The following describes Drop control for the optical receiver OR1 only. The operation performed in Steps S12 to S15 explained below is basically identical with that described above with reference to FIG. 7.

[S11] The switch SW1 arranged upstream of the optical receiver OR1 is turned OFF.

[S12] The filter controller 12-1 applies the RF signal to the AOTF 11-1 while scanning wavelength over the entire signal bandwidth, and receives, from the PD 22-1, a monitor signal indicative of the reference wavelength transmitted through the reference wavelength filter 21-1.

[S13] The filter controller 12-1 stores the reference RF.

[S14] On receiving a wavelength selection request, the filter controller 12-1 obtains a target RF based on the reference RF and a relative position of a target wavelength to be selected with respect to the reference wavelength, and applies the target RF to the AOTF 11-1.

[S15] While monitoring the monitor signal from the monitor 30-1, the filter controller 12-1 applies the RF signal to the AOTF 11-1 with the frequency thereof varied in the vicinity of the target RF, to detect a maximum value of the monitor signal and thereby determine an optimum target RF.

[S16] The switch SW1 is turned ON to drop the target wavelength signal, so that the optical receiver OR1 receives the signal with the target wavelength which is the set Drop wavelength. If the Drop control for the optical receiver OR2 is then to be performed, the switch SW2 is turned OFF, and after an optimum target RF for the AOTF 11-2 is determined, the switch SW2 is turned ON. The Drop control for the other optical receivers is carried out in like manner.

In the configuration shown in FIG. 15, the switches SW1 to SW4 are provided so that wavelengths other than the set wavelengths may not be erroneously dropped. Instead of using the switches SW1 to SW4, the output power levels (transmitted light levels) of the AOTFs 11-1 to 11-4 may be set to a level lower than a minimum optical reception level of the optical receivers OR1 to OR4, and also in this case, the same effect can be obtained.

When the Drop control for the optical receiver OR1, for example, is to be performed, the power of the RF signal applied to the AOTF 11-1 is lowered such that the transmitted light level of the AOTF 11-1 is lower than the minimum reception level of the optical receiver OR1, and then the wavelength scan is performed. Thus, where the transmitted light level is adjusted by changing the RF signal power applied to the AOTF 11-1, the optical receiver OR1 can be prevented from receiving wavelengths other than the set wavelength. The PDs 22-1 to 22-4 and the monitors 30-1 to 30-4 have minimum reception levels lower than that of the optical receivers OR1 to OR4 by about 20 dB (namely, the PDs 22-1 to 22-4 and the monitors 30-1 to 30-4 have receiving sensitivities higher than that of the optical receivers OR1 to OR4).

Figure 14:
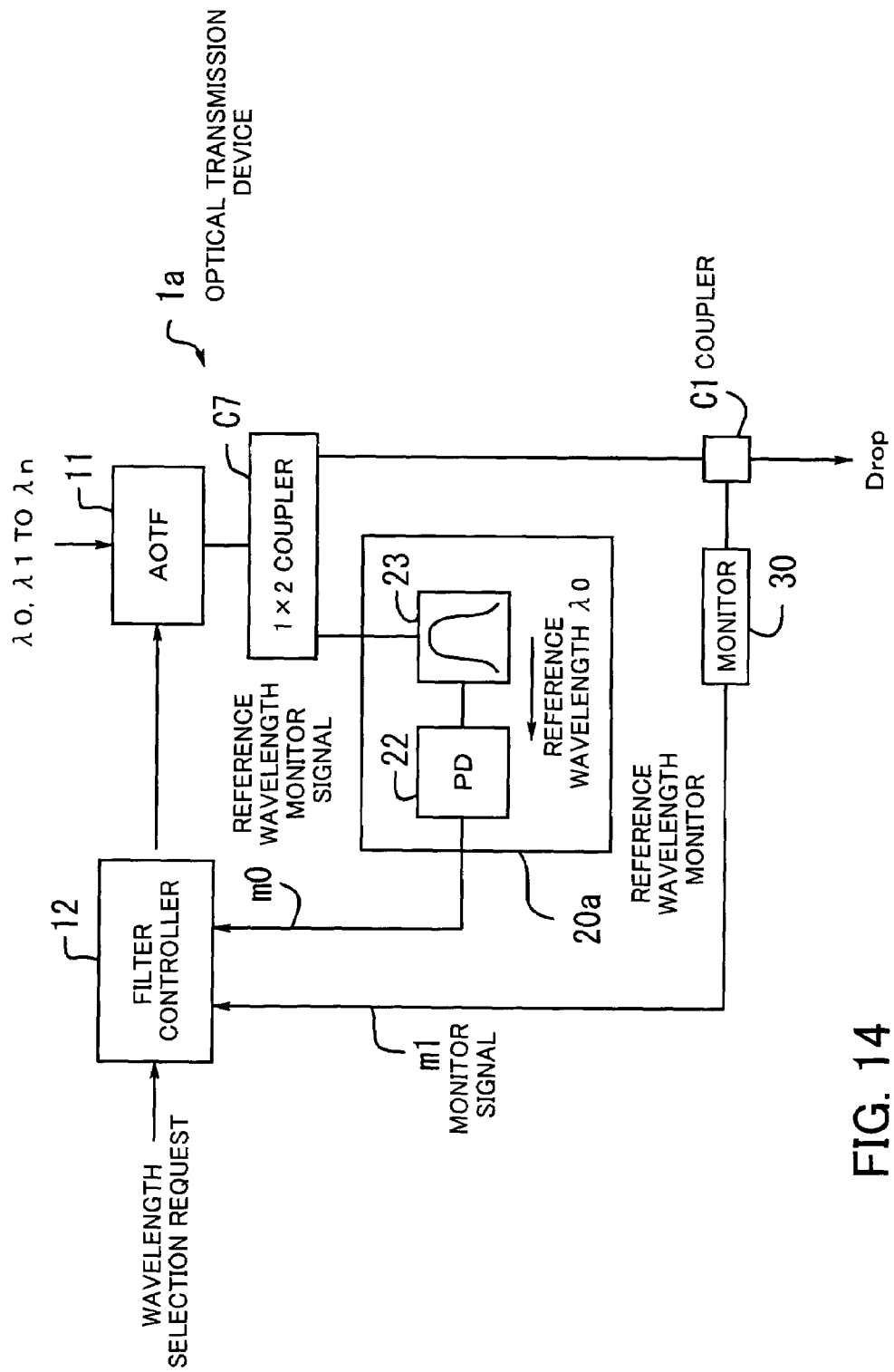
FIG. 14 shows a modification of the reference wavelength monitor.
Figure 17:
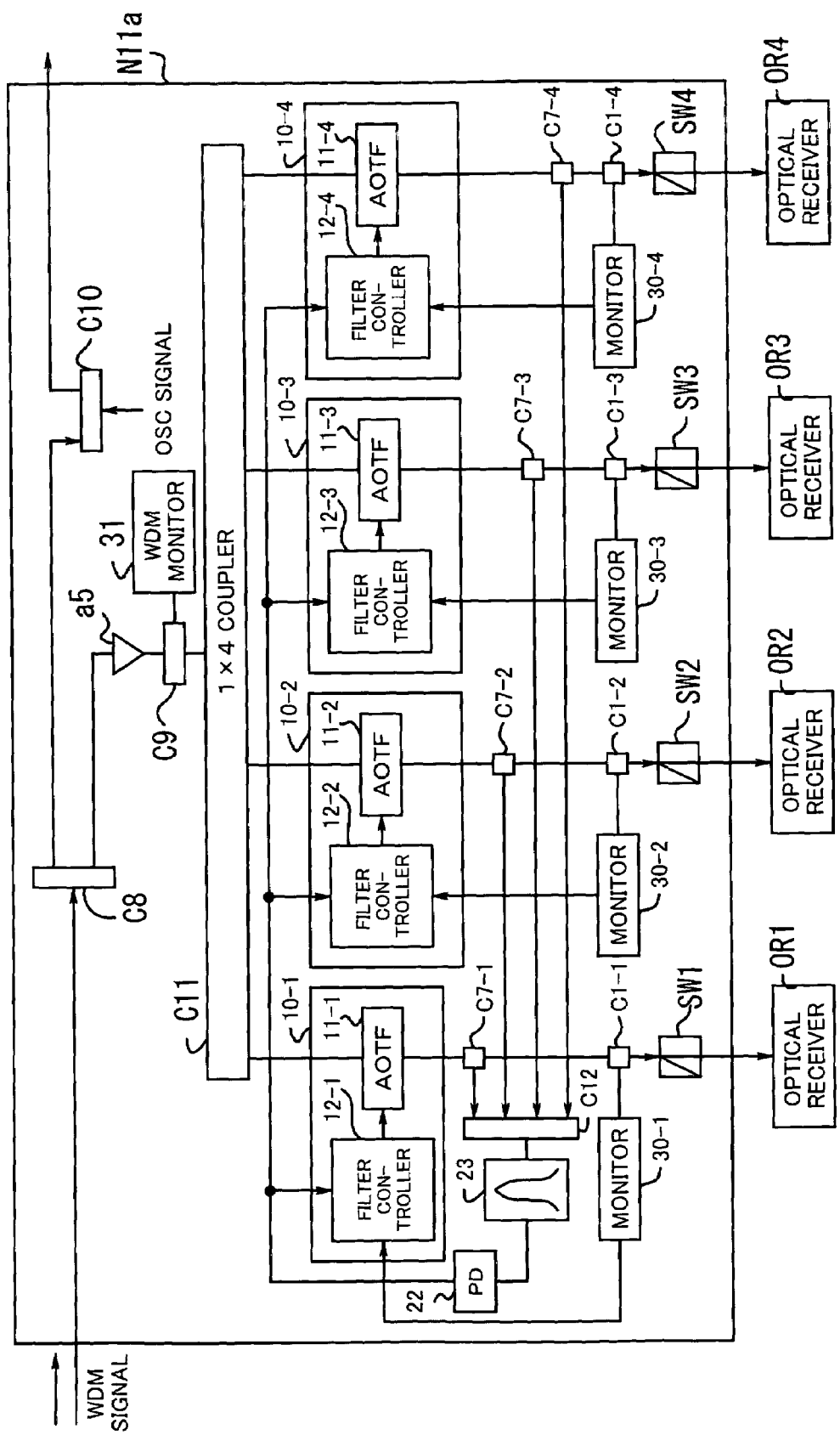
FIG. 17 shows the configuration of another node.

The configuration and operation of a node which has the function of preventing wavelengths other than the set wavelength from being dropped and to which the reference wavelength monitor 20*a*, shown in FIG. 14 as a modification, is applied will be now described. FIG. 17 shows the configuration of the Drop section of such a node N11*a*. Optical receivers OR1 to OR4 are arranged on the tributary side of the node N11*a*.

An input WDM signal is split by the 1×4 coupler C11 into four identical signals, and up to this process, the node operates in the same manner as explained above with reference to FIG. 15 by using identical elements. The 1×4 coupler C11 has four output lines connected with wavelength selectors 10-1 to 10-4, respectively. The wavelength selectors 10-1 to 10-4 include AOTFs 11-1 to 11-4, respectively, the outputs of which are connected to couplers C7-1 to C7-4, respectively.

The couplers C7-1 to C7-4 each split the output of the corresponding one of the AOTFs 11-1 to 11-4 into two, one being output to a coupler C12 while the other being output to a corresponding one of couplers C1-1 to C1-4. The coupler C12 multiplexes the signals from the couplers C7-1 to C7-4 and outputs the multiplexed signal to the reference wavelength filter 23 (one-wavelength filter 23). The one-wavelength filter 23 passes one reference wavelength therethrough and outputs the reference wavelength to the PD 22.

The couplers C1-1 to C1-4 each split the output of the corresponding one of the AOTFs 11-1 to 11-4 into two, one being output to a corresponding one of monitors 30-1 to 30-4 while the other being output to a corresponding one of switches SW1 to SW4. Monitor signals from the PD 22 and the monitors 30-1 to 30-4 are fed back to the filter controllers 12-1 to 12-4. The switches SW1 to SW4 are connected to the optical receivers OR1 to OR4, respectively.

In the node N11a configured as above, the ON/OFF switches SW1 to SW4 are connected to output signal lines of the respective AOTFs 11-1 to 11-4, and while the wavelength scan of the AOTFs 11-1 to 11-4 is performed, the switches SW1 to SW4 are turned OFF so that signals other than the set wavelengths may not be dropped to the optical receivers OR1 to OR4. Also, when the wavelength scan of the AOTFs 11-1 to 11-4 is performed, the output levels of AOTFs (AOTF output ports) other than that with respect to which wavelength matching is carried out are reduced to such a low level as not to be input to the one-wavelength filter 23.

Figure 18:
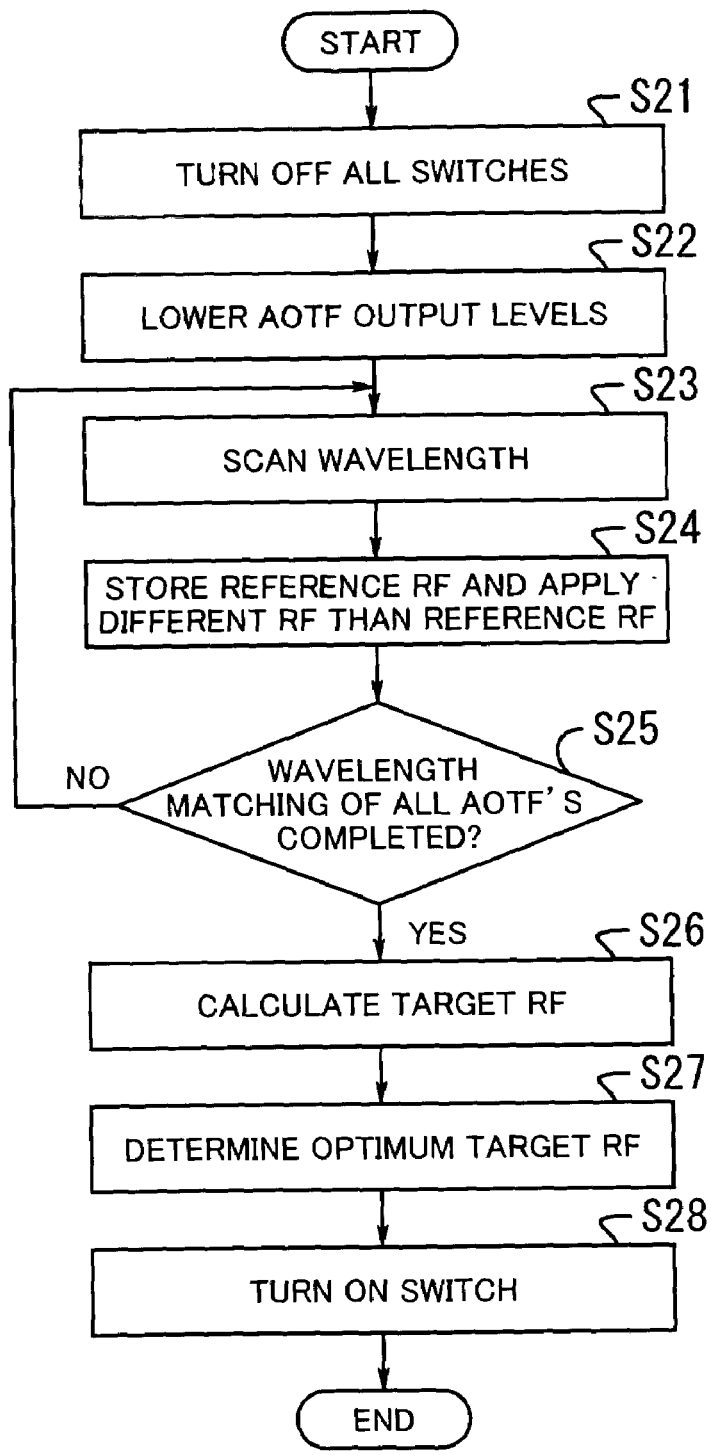
FIG. 18 is a flowchart illustrating the operation of the node.

FIG. 18 is a flowchart illustrating the operation of the node N11a. In the following, the Drop control for the optical receiver OR1 alone will be explained.

[S21] All the switches SW1 to SW4 arranged upstream of the optical receivers OR1 to OR4 are turned OFF.

[S22] The filter controllers 12-1 to 12-4 adjust the RF power to reduce the output levels of the AOTFs 11-1 to 11-4 to such a low level as not to be input to the one-wavelength filter 23.

[S23] One of the filter controllers 12-1 to 12-4 applies the RF signal with increased power to the corresponding AOTF while scanning wavelength with the RF over the entire signal bandwidth, and receives the optical power transmitted through the one-wavelength filter 23.

[S24] The filter controller stores the reference RF for the corresponding AOTF and then sets the RF to a frequency different from the reference RF (to permit the one-wavelength filter 23 to detect the reference wavelength λ0 transmitted through the other AOTFs).

[S25] If wavelength matching of all AOTFs is completed, the process proceeds to Step S26; if not, the process returns to Step S23.

[S26] On receiving a wavelength selection request (in this instance, assumed to be a wavelength selection request for the AOTF 11-1), the filter controller 12-1 obtains a target RF based on the reference RF and a relative position of a target wavelength to be selected with respect to the reference wavelength, and applies the target RF to the AOTF 11-1.

[S27] While monitoring the monitor signal from the monitor 30-1, the filter controller 12-1 applies the RF signal to the AOTF 11-1 with the frequency thereof varied in the vicinity of the target RF, to detect a maximum value of the monitor signal and thereby determine an optimum target RF.

[S28] The switch SW1 is turned ON to drop the target wavelength signal, so that the optical receiver OR1 receives the signal with the target wavelength. In this manner, the Drop control for the optical receiver OR1 is performed. The Drop control for the other optical receivers OR2 to OR4 is carried out in like manner. Also in this configuration, instead of using the switches SW1 to SW4, the output power levels (transmitted light levels) of the AOTFs 11-1 to 11-4 may be set to a level lower than the minimum optical reception level of the optical receivers OR1 to OR4 so that the node may have the function of preventing wavelengths other than the set wavelengths from being dropped.

In the following, optical continuity test will be explained. According to the present invention, the Add section in the node is arranged on the upstream side and the Drop section including the optical transmission device 1 is arranged on the downstream side. This arrangement permits the monitor 30 to detect the Drop wavelength to be dropped (the monitor 30, which is used for the wavelength selection by the AOTF 11, also functions as a monitoring section for monitoring the Drop wavelength), whereby optical continuity of a specified wavelength alone can be checked. Also, unlike the conventional optical loopback test, the communication path is not cut off, and accordingly, the optical continuity test never adversely affects the other nodes communicating by means of other wavelengths.

Figure 19:
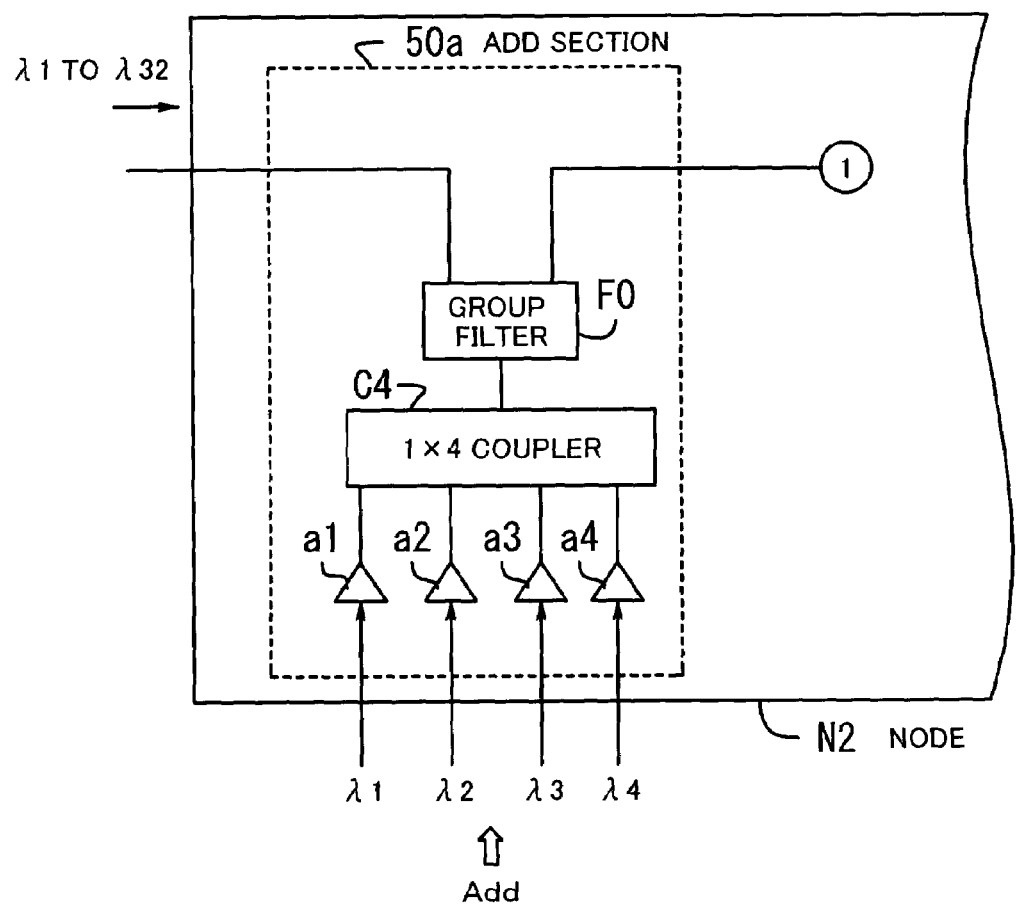
FIG. 19 shows the configuration of a node adapted to monitor Add wavelengths.
Figure 20:
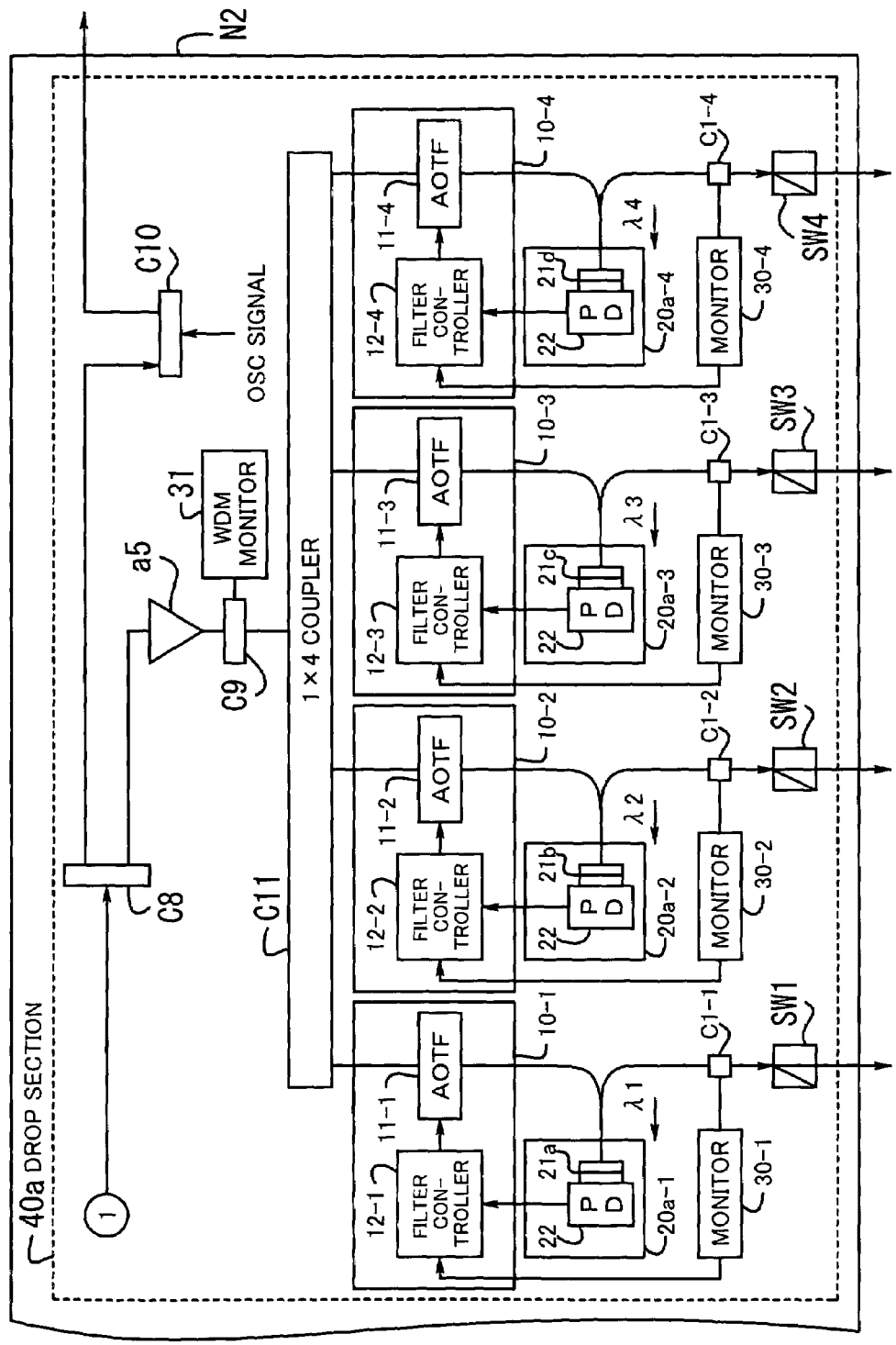
FIG. 20 also shows the configuration of the node adapted to monitor Add wavelengths.

On the other hand, where Add wavelengths are used as the reference wavelengths, reference wavelength monitors for detecting the respective Add wavelengths may be provided to monitor the Add wavelengths. FIGS. 19 and 20 show the configuration of a node adapted to monitor Add wavelengths. The node N2 has an Add section 50a and a Drop section 40a and selects wavelengths by using Add wavelengths λ1 to λ4 as the reference wavelengths.

The Add section 50a shown in FIG. 19 is similar in configuration to the Add section 50 shown in FIG. 10 but is not provided with the reference wavelength light source LD and the coupler C5. The configuration of the Drop section 40a shown in FIG. 20 is basically identical with that of the Drop section shown in FIG. 15. However, reference wavelength filters 21a to 21d in reference wavelength monitors 20a-1 to 20a-4 filter out the respective wavelengths λ1 to λ4 as the reference wavelengths.

In the node N2 configured as above, the Add wavelengths λ1 to λ4 are used as the reference wavelengths, and therefore, the reference wavelength light source is unnecessary. Also, the reference wavelength filters 21a to 21d detect the respective Add wavelengths λ1 to λ4, thus providing the Add wavelength monitoring function.

Figure 21:
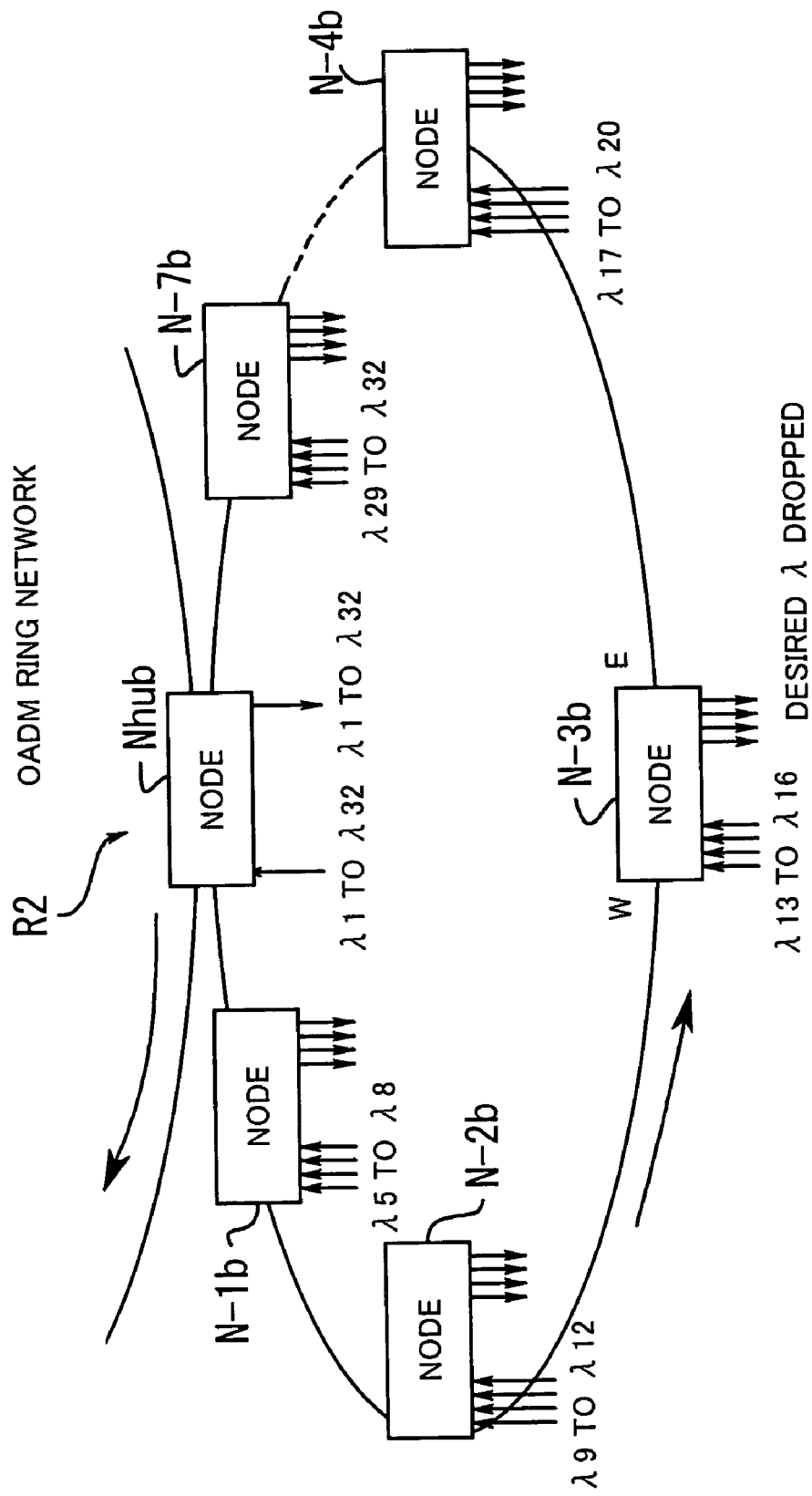
FIG. 21 shows the configuration of an OADM ring network.

FIG. 21 shows an OADM ring network, which is the OADM ring network R2 shown in FIG. 6. The node Nhub is capable of adding/dropping wavelengths λ1 to λ32, and the nodes N-1b to N-7b add wavelengths λ5 to λ8, λ9 to λ12, λ13 to λ16, λ17 to λ20, λ21 to λ24, λ25 to λ28, and λ29 to λ32, respectively. Drop wavelengths are selected as desired. If the Add wavelengths added by the node N2 shown in FIGS. 19 and 20 are λ13 to λ16, then the node corresponds to the node N-3b.

An optical transmission device for monitoring Add wavelengths will be now described. The aforementioned Add wavelength monitoring is achieved by the reference wavelength monitors in the Drop section which are used also for the wavelength selection by the AOTFs. In the optical transmission device described below, the Add section is provided specially with an Add wavelength monitoring function.

Figure 22:
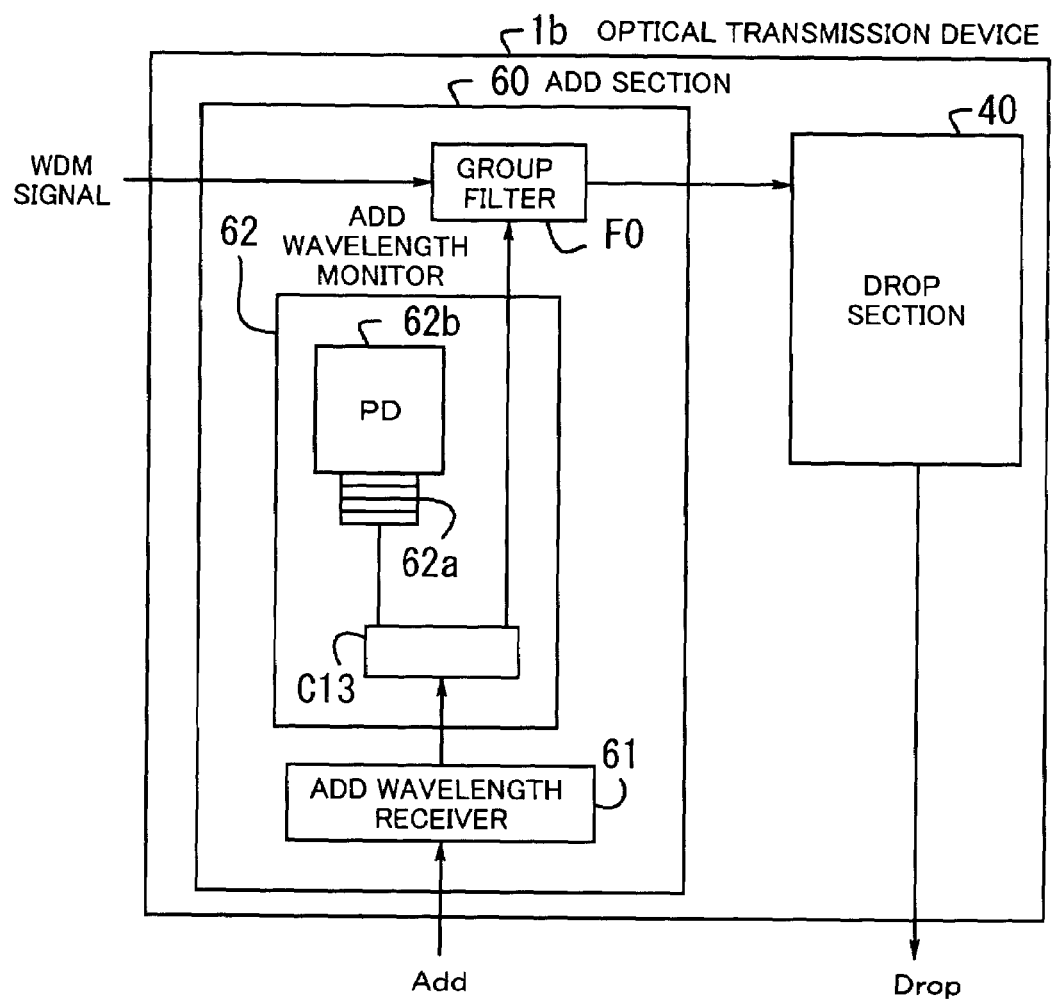
FIG. 22 shows the configuration of an optical transmission device with Add wavelength monitoring function.

FIG. 22 shows the configuration of such an optical transmission device having the Add wavelength monitoring function. The optical transmission device 1b comprises an Add section 60 and a Drop section 40. The Add section 60 includes an Add wavelength receiver (optical add signal receiver) 61, an Add wavelength monitor (optical add wavelength monitor) 62, and a group filter F0. In the illustrated configuration, only one wavelength is added (In practice, a plurality of wavelengths are added, and therefore, a coupler etc. for multiplexing the multiple Add wavelengths are needed but are omitted for simplicity's sake. Also, the configuration and operation of the Drop section 40 are already explained above, and therefore, description thereof is omitted).

The Add wavelength receiver 61 receives an Add wavelength (and thus functions simply as a receiving port). The Add wavelength monitor 62 is constituted by a coupler C13, an Add wavelength filter 62a, and a PD 62b. The coupler C13 splits the Add wavelength signal into two, one being output to the Add wavelength filter 62a while the other being output to the group filter F0.

The Add wavelength filter 62a transmits only the set Add wavelength therethrough, and the PD 62b measures the power of the transmitted Add wavelength. If the Add wavelength to be added is $\lambda 5$, for example, the Add wavelength filter 62a is constituted by a filter capable of transmitting only $\lambda 5$ therethrough, and the PD 62b measures the optical power of $\lambda 5$.

Accordingly, when the set wavelength $\lambda 5$ is added, the Add section 60 can detect the optical power of the Add wavelength, and if a wrong wavelength different from $\lambda 5$ is added, no optical power is detected. Thus, by detecting the optical power, it is possible to monitor the Add wavelength.

Figure 23:
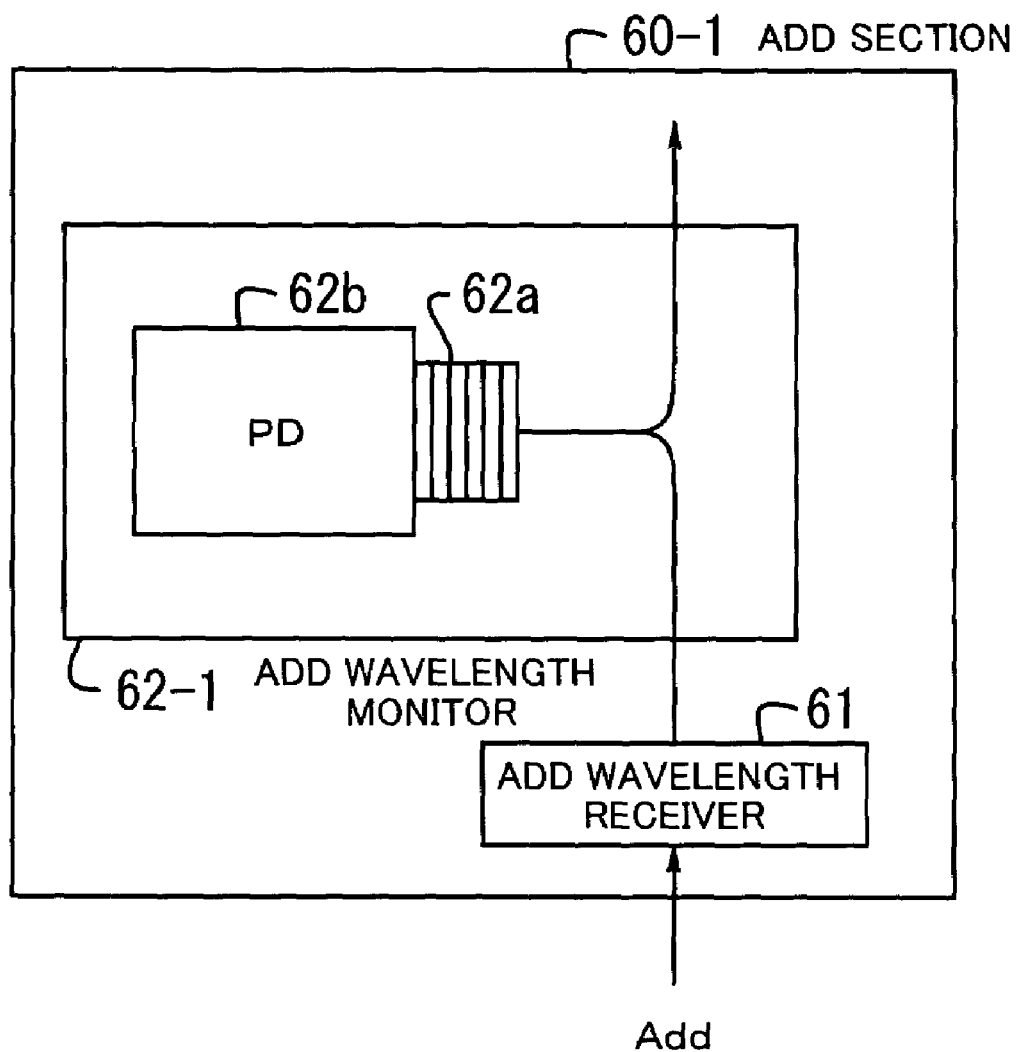
FIG. 23 shows a modification of an Add section.

FIG. 23 shows a modification of the Add section 60. An Add section 60-1 comprises an Add wavelength monitor 62-1 and an Add wavelength receiver 61 (in this and the following figures, the group filter F0 is omitted). The Add wavelength monitor 62-1, which is a wavelength filter-combined monitor PD in which an Add wavelength filter 62a and a PD 62b are integrated, transmits only a specified wavelength therethrough and reflects the other wavelengths. Where the elements are connected as illustrated, the Add wavelength monitor 62-1 does not require the coupler C13 shown in FIG. 22.

Figure 24:
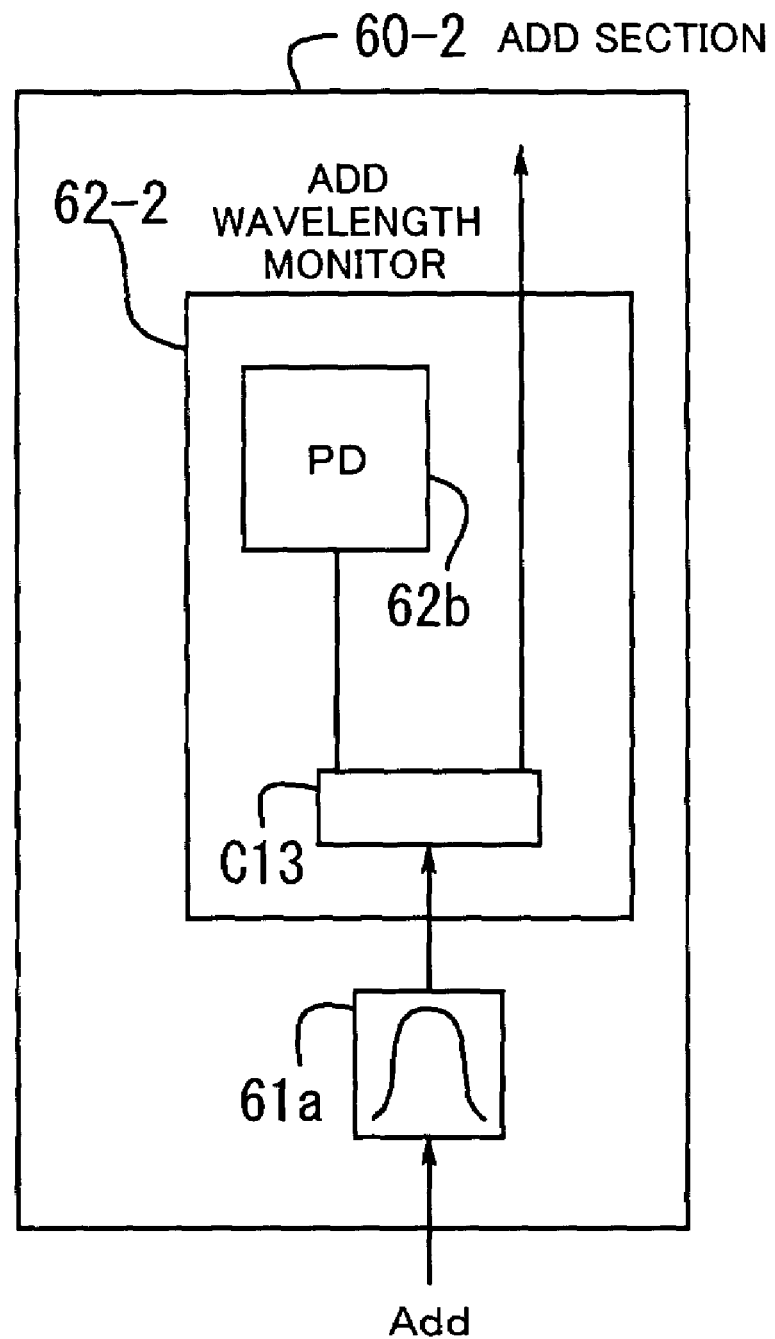
FIG. 24 shows another modification of the Add section.

FIG. 24 shows another modification of the Add section 60. An Add section 60-2 comprises an Add wavelength monitor 62-2 and a one-wavelength filter 61a. The Add section 60-2 uses the one-wavelength filter 61a as the Add wavelength receiver, thereby making it possible to omit the Add wavelength filter 62a from the Add wavelength monitor 62.

If the Add wavelength to be added is $\lambda 5$, the one-wavelength filter 61a transmits only $\lambda 5$ therethrough. The Add wavelength $\lambda 5$ is then split by the coupler C13, so that the optical power thereof is measured by the PD 62b. Thus, by arranging the one-wavelength filter 61a in the Add line, it is possible to pass only the set Add wavelength signal and to prevent other wavelengths from being erroneously added. Namely, when the correct wavelength is added, the Add wavelength passes through the one-wavelength filter 61a and is monitored by the PD 62b so that the optical power thereof may be detected. On the other hand, when a wrong wavelength is input, the wavelength is cut off by the one-wavelength filter 61a and thus is never added (at this time, no optical power is detected by the PD 62b, and therefore, the Add wavelength can be monitored by detecting the optical power).

Accordingly, even in the case where an extension unit is erroneously inserted at the time of in-service installation, for example, the protective mechanism (fail-safe mechanism) functions, making it possible to prevent the network from going down.

Figure 25:
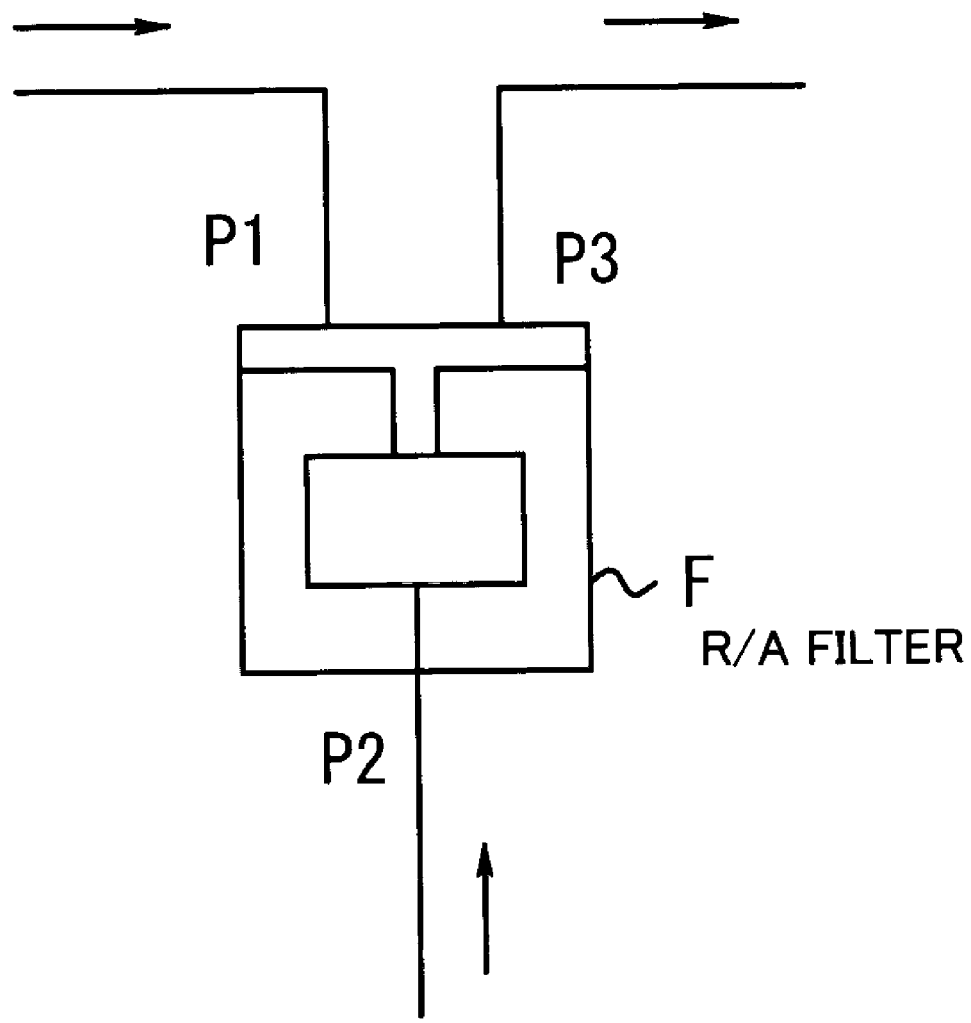
FIG. 25 shows an R/A filter.

The following describes the configuration of an Add section using reject/add filters (hereinafter referred to as R/A filters) each having a plurality of ports. First, the R/A filter will be explained with reference to FIG. 25. The R/A filter F has two input ports P1 and P2 and one output port P3.

The R/A filter F transmits a predetermined wavelength input from the port P2 and outputs the transmitted wavelength from the port P3. With respect to wavelengths input from the port P1, a wavelength corresponding to the predetermined wavelength input from the port P2 is rejected and the remaining wavelengths are transmitted to be output from the port P3.

Figure 26:
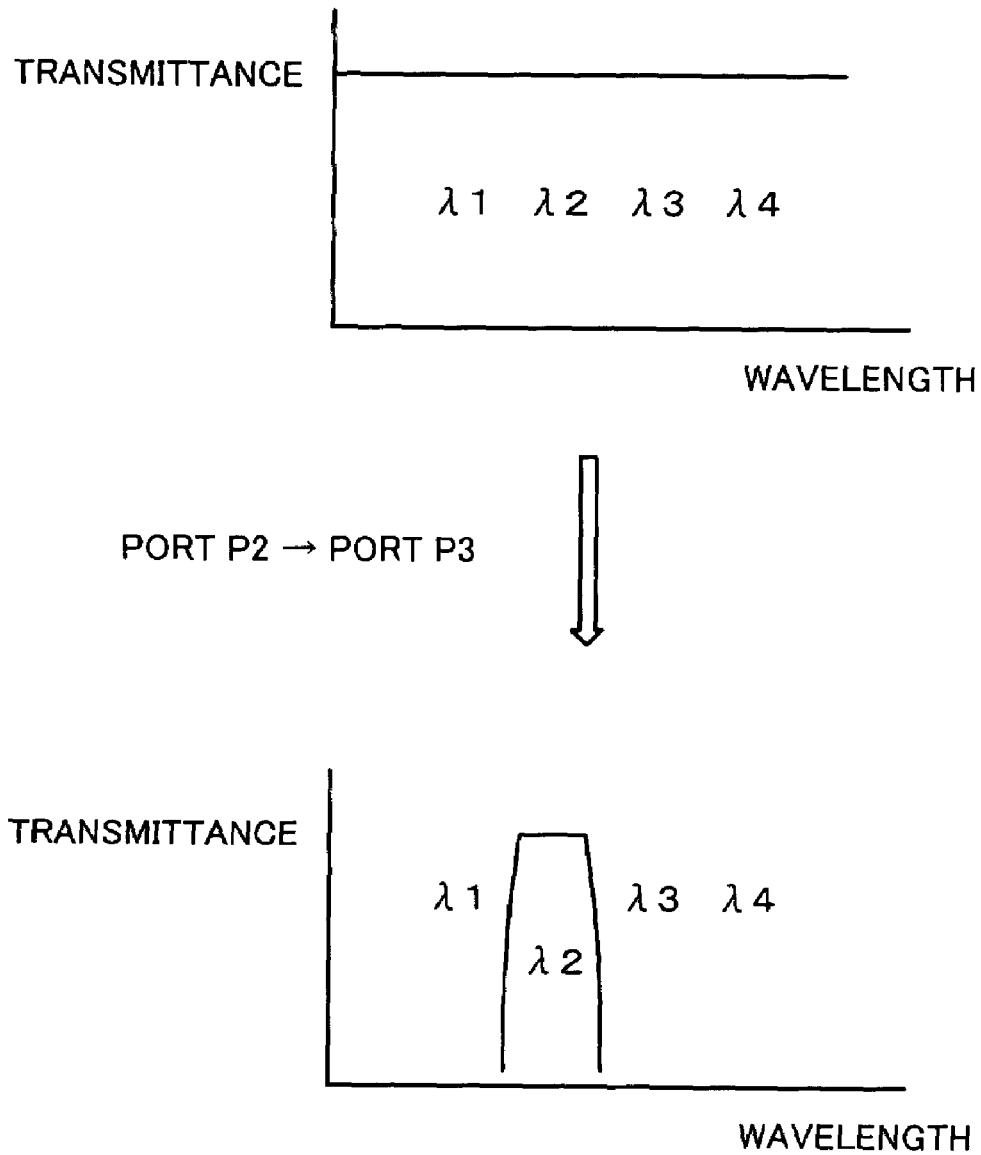
FIG. 26 illustrates the characteristic of the R/A filter.
Figure 27:
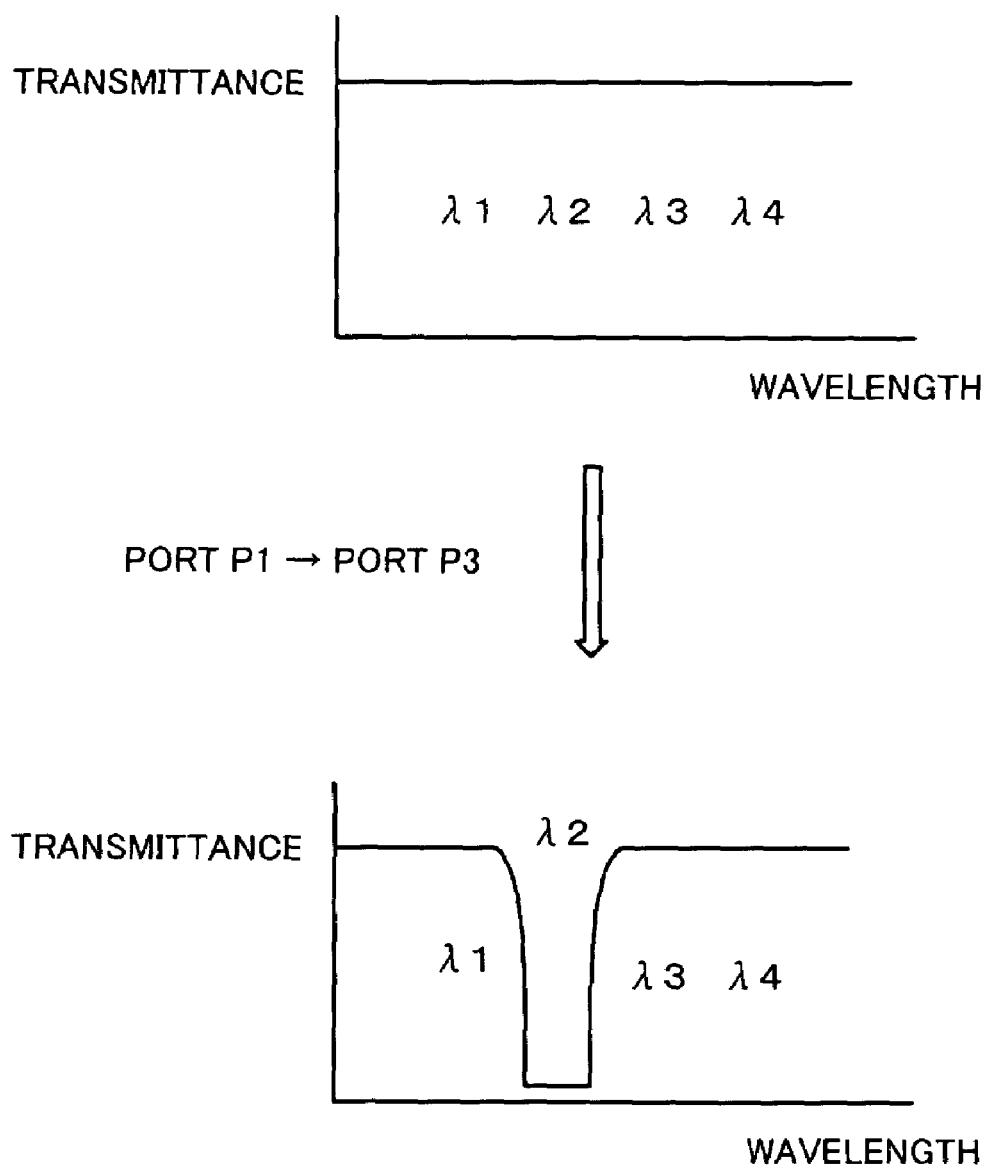
FIG. 27 also illustrates the characteristic of the R/A filter.

FIGS. 26 and 27 illustrate the characteristic of the R/A filter F, wherein the vertical axis indicates transmittance (dB) and the horizontal axis indicates wavelength. Specifically, FIG. 26 shows how light is transmitted from the port P2 to the port P3, and FIG. 27 shows how light is transmitted from the port P1 to the port P3.

In the case where the transmission wavelength of the R/A filter F is $\lambda 2$ and a signal in which wavelengths $\lambda 1$ to $\lambda 4$ are multiplexed is input from each of the ports P1 and P2, only the wavelength $\lambda 2$ among the wavelengths $\lambda 1$ to $\lambda 4$ input from the port P2 is transmitted to the port P3, as shown in FIG. 26. Also, as shown in FIG. 27, only the wavelength $\lambda 2$ among the wavelengths $\lambda 1$ to $\lambda 4$ input from the port P1 is rejected and the remaining wavelengths $\lambda 1$, $\lambda 3$ and $\lambda 4$ are transmitted to the port P3.

Figure 28:
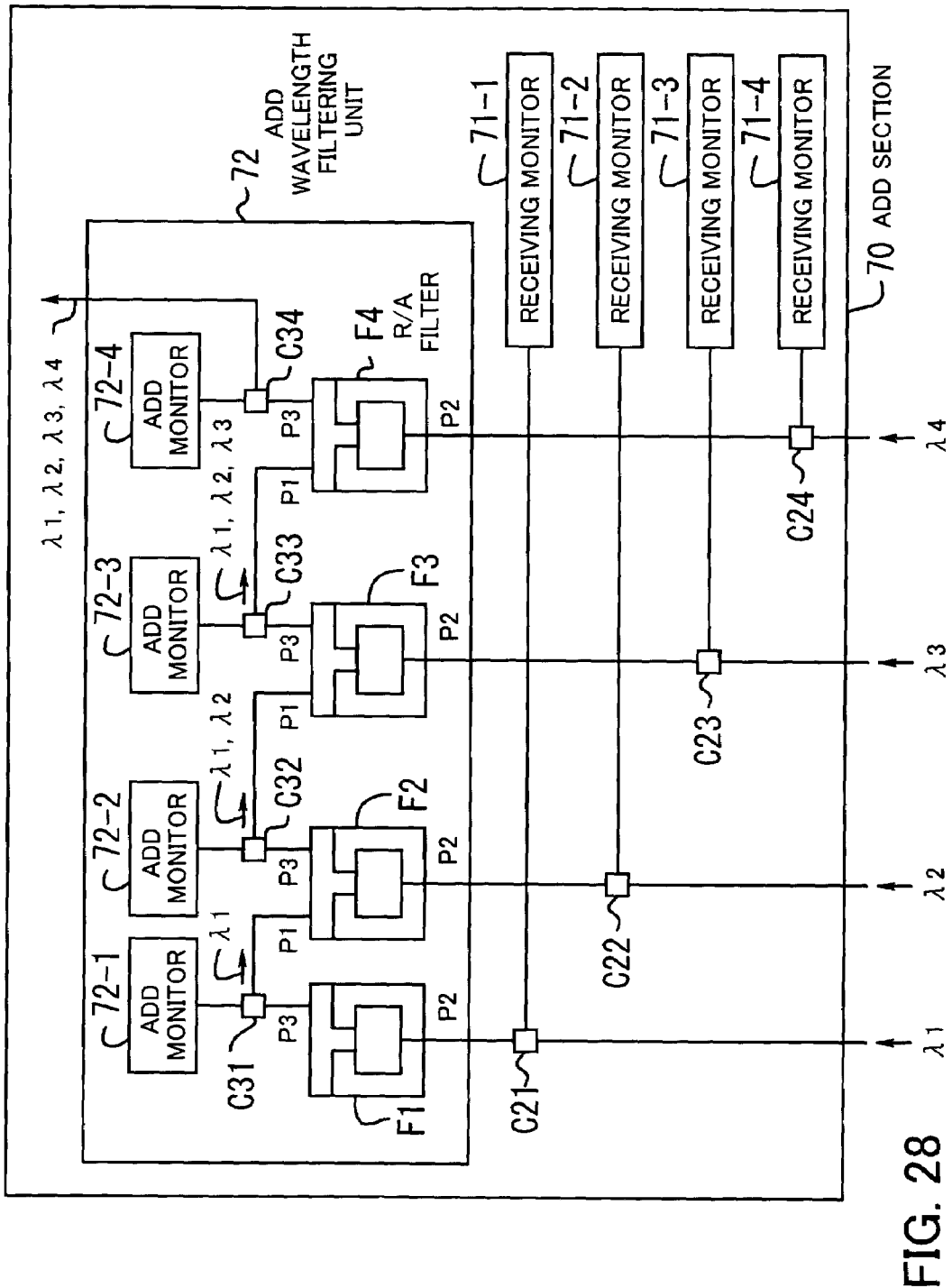
FIG. 28 shows the configuration of an Add section in an optical transmission device.

FIG. 28 shows the configuration of the Add section in an optical transmission device. The Add section 70 is configured to add four wavelengths and includes receiving monitors 71-1 to 71-4, couplers C21 to C24, and an Add wavelength filtering unit 72. The Add wavelength filtering unit 72 includes R/A filters F1 to F4, couplers C31 to C34, and Add monitors 72-1 to 72-4.

Also, Add lines associated with respective Add wavelengths are connected to the ports P2 of the R/A filters F1 to F4 through the couplers C21 to C24, respectively. The R/A filters F1 to F4 are connected to each other at their respective ports via the couplers C31 to C34 in the form of daisy chain.

Specifically, the port P3 of the R/A filter F1 is connected to the port P1 of the R/A filter F2 through the coupler C31. The port P3 of the R/A filter F2 is connected to the port P1 of the R/A filter F3 through the coupler C32, and the port P3 of the R/A filter F3 is connected to the port P1 of the R/A filter F4 through the coupler C33. The R/A filters F1 to F4 have transmission wavelengths $\lambda 1$ to $\lambda 4$, respectively.

When the wavelengths $\lambda 1$ to $\lambda 4$ are added to the Add section 70, the couplers C21 to C24 each split a corresponding one of the Add wavelength signals $\lambda 1$ to $\lambda 4$ into two, one being output to a corresponding one of the receiving monitors 71-1 to 71-4 while the other being output to the Add wavelength filtering unit 72. The receiving monitors 71-1 to 71-4 each monitor the optical power of the corresponding Add wavelength and determine whether the corresponding Add wavelength is being received or not.

The R/A filter F1 transmits the wavelength $\lambda 1$ input from the port P2 through to the port P3, and the coupler C31 splits $\lambda 1$ to be applied to the Add monitor 72-1 and the R/A filter F2. The R/A filter F2 transmits the wavelengths $\lambda 1$ and $\lambda 2$ input from the ports P1 and P2, respectively, through to the port P3. The coupler C32 splits $\lambda 1$ and $\lambda 2$ to be applied to the Add monitor 72-2 and the R/A filter F3.

The R/A filter F3 transmits the wavelengths $\lambda 1$ and $\lambda 2$ input from the port P1 and the wavelength $\lambda 3$ input from the port P2 through to the port P3. The coupler C33 splits $\lambda 1$ to $\lambda 3$ to be applied to the Add monitor 72-3 and the R/A filter F4.

The R/A filter F4 transmits the wavelengths $\lambda 1$ to $\lambda 3$ input from the port P1 and the wavelength $\lambda 4$ input from the port P2 through to the port P3. The coupler C34 splits $\lambda 1$ to $\lambda 4$ into two, one of which is output to the Add monitor 72-4.

Provided the optical power of $\lambda 1$ monitored by the Add monitor 72-1 is M1, the optical power of $\lambda 1$ and $\lambda 2$ monitored by the Add monitor 72-2 is M2, the optical power of $\lambda 1$, $\lambda 2$ and $\lambda 3$ monitored by the Add monitor 72-3 is M3, and the optical power of $\lambda 1$, $\lambda 2$, $\lambda 3$ and $\lambda 4$ monitored by the Add monitor 72-4 is M4, the monitored values have magnitudes satisfying the relationship: M1<M2<M3<M4. Accordingly, as far as the correct wavelengths are added, this relationship is observed, whereby the Add wavelengths can be monitored by means of the relationship of the monitored values.

Also, in the above configuration, the R/A filters F1 to F4 are connected together at their input and output ports in the form of daisy chain so that the multiple Add wavelengths may finally be output from a single line, and this makes it possible to reduce the insertion loss. Where four Add wavelengths are multiplexed by a coupler, for example, an insertion loss of 6 dB is caused in principle. According to the present invention, the insertion loss per filter is about 0.3 dB, and thus the overall insertion loss can be reduced to 1.2 dB.

A modification of the Add wavelength filtering unit 72 will be now described with reference to FIG. 29. An Add wavelength filtering unit 72$a$-1 includes a group-type R/A filter 73 as an additional element (the group-type R/A filter 73 has transmission wavelengths $\lambda 3$ and $\lambda 4$).

Also, instead of connecting all of the R/A filters F1 to F4 in the form of daisy chain, the R/A filters F1 to F4 are divided into two groups, the line L1 of the coupler C32 is connected to a port P5 of the group-type R/A filter 73, and the line L2 of the coupler C34 is connected to a port P4 of the group-type R/A filter 73.

The wavelengths $\lambda 3$ and $\lambda 4$ sent from the coupler C34 through the line L2 are input to the port P4 of the group-type R/A filter 73 and transmitted through to the port P5. The wavelengths $\lambda 1$ and $\lambda 2$ sent from the coupler C32 through the line L1 are rejected (reflected) at the port P5 of the group-type R/A filter 73. Consequently, the multiplexed signal with wavelengths $\lambda 1$ to $\lambda 4$ is output from the port P5. With the Add wavelength filtering unit 72$a$-1 configured in this manner, the optical loss of the Add wavelengths caused when the wavelengths pass through optical elements such as the R/A filters F1 to F4 and the couplers C31 to C34 can be reduced by half, compared with the configuration of FIG. 28 in which all of the R/A filters F1 to F4 are connected in the form of daisy chain.

Figure 30:
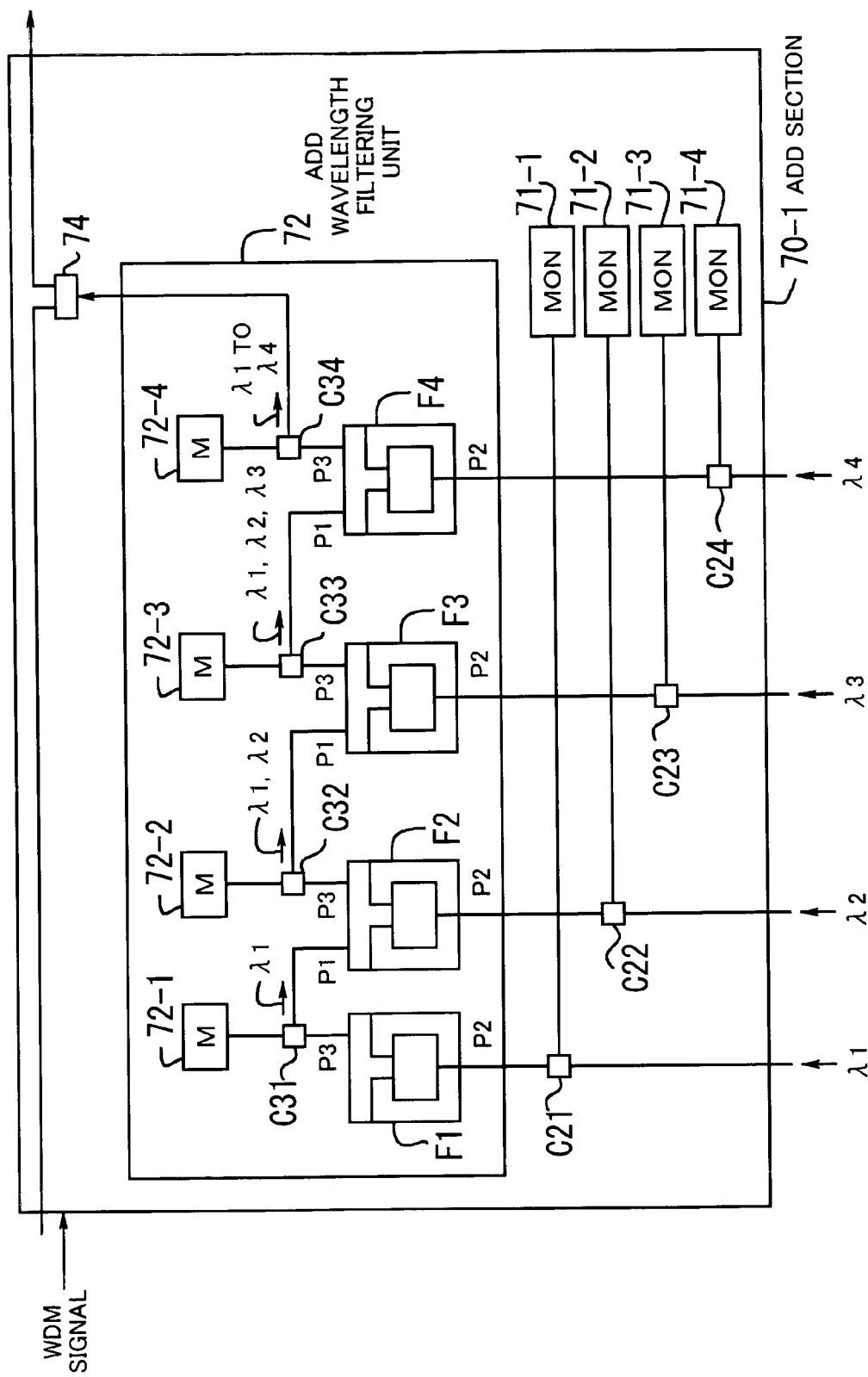
FIG. 30 shows the configuration of another Add section.

The following describes configurations wherein Add wavelengths are multiplexed with (added to) an incoming WDM signal from the network. FIG. 30 shows the configuration of such an Add section. Compared with the configuration shown in FIG. 28, the Add section 70-1 additionally includes a multiplexer 74 which is, for example, a coupler or a group filter. With this configuration, the WDM signal from the network is multiplexed with the Add wavelengths.

Figure 31:
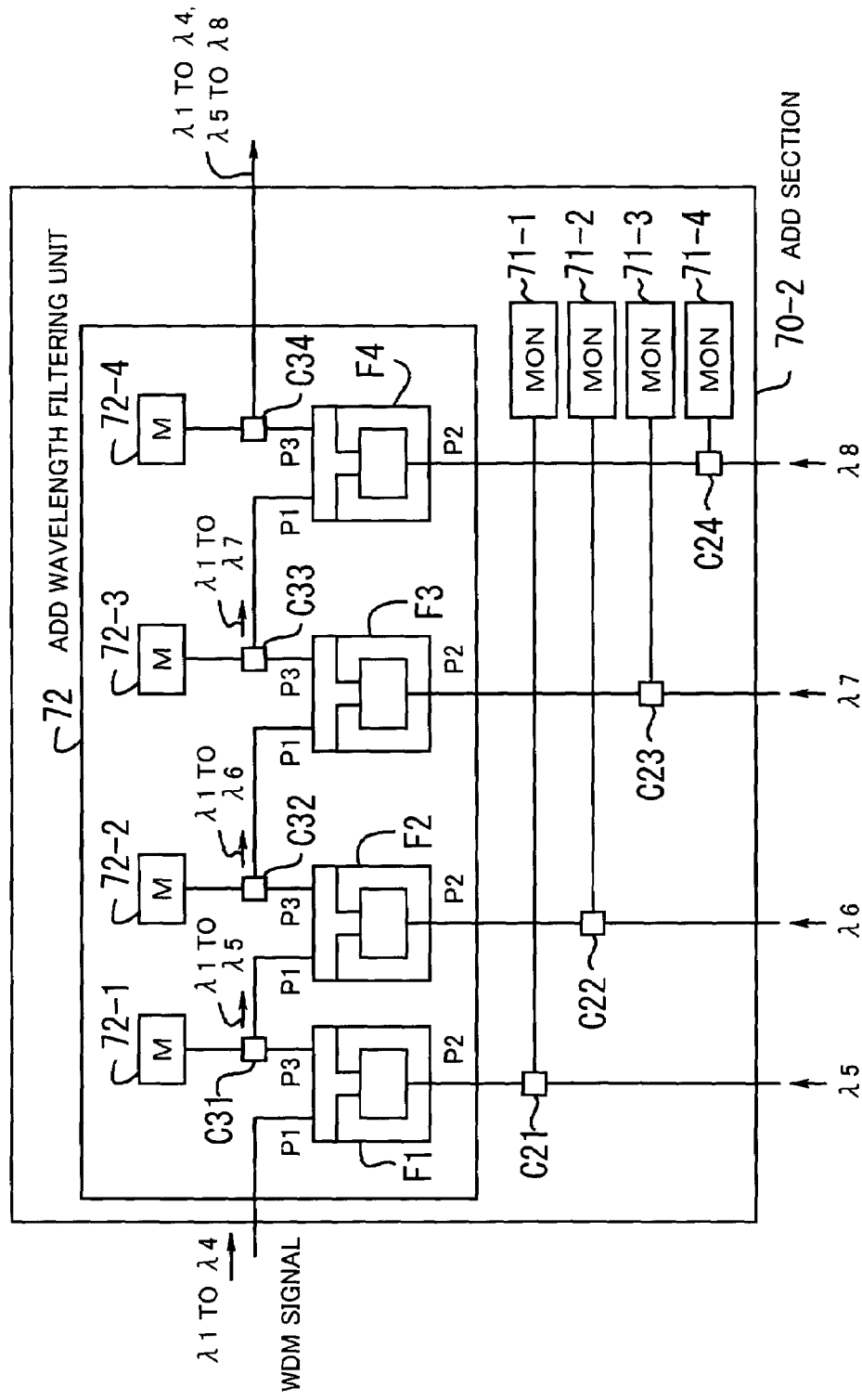
FIG. 31 shows the configuration of still another Add section.

FIG. 31 shows the configuration of another Add section. In the Add section 70-2, an incoming WDM signal from the network is input to the port P1 of the R/A filter F1, and a signal in which the WDM signal is multiplexed with Add wavelengths is output from the port P3 of the R/A filter F4 and sent out through the coupler C34. For example, where the Add wavelengths are $\lambda 5$ to $\lambda 8$ and the input WDM signal has wavelengths $\lambda 1$ to $\lambda 4$, the multiplexed signal with wavelengths $\lambda 1$ to $\lambda 8$ is output from the port P3 of the R/A filter F4.

Figure 32:
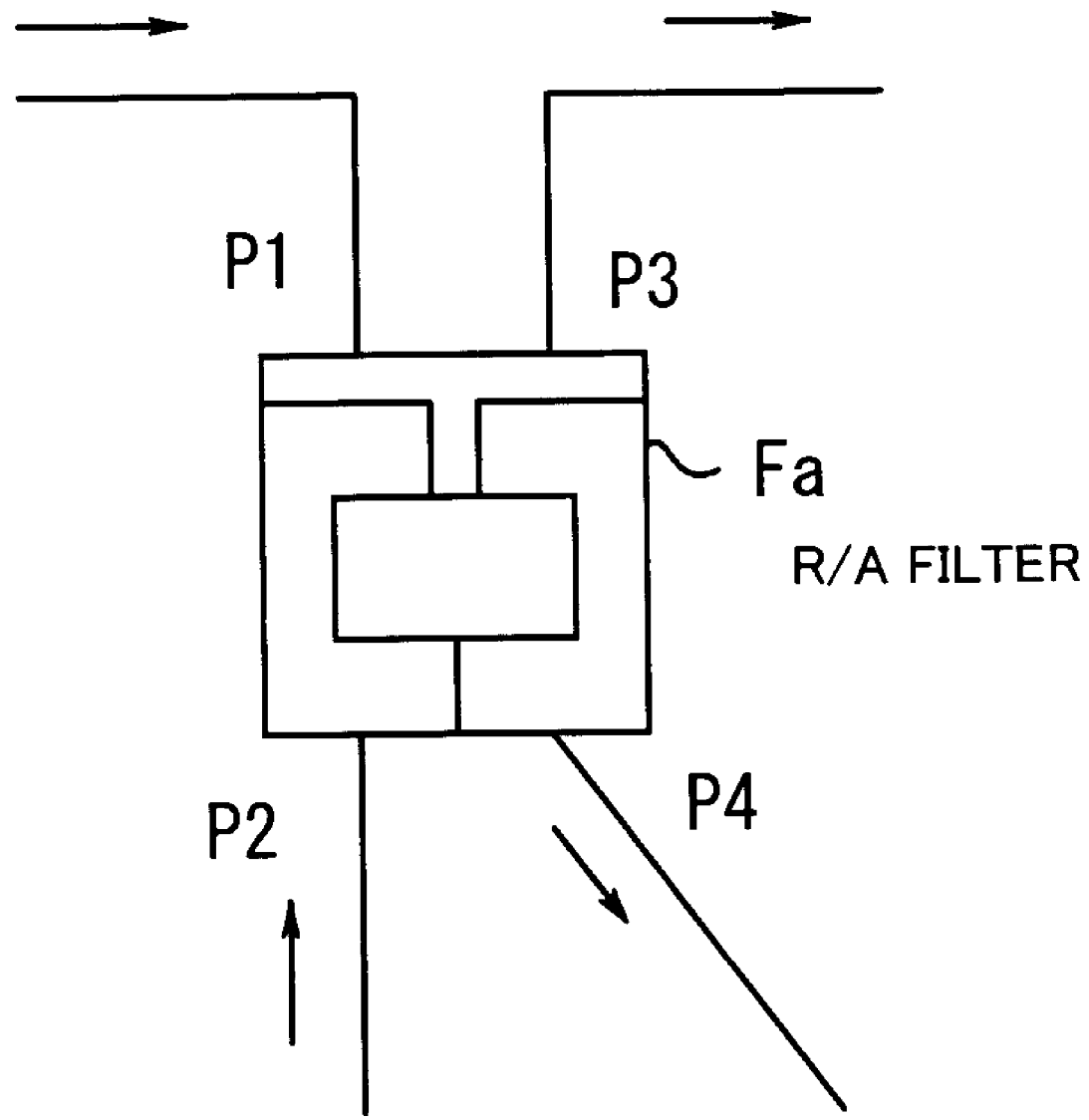
FIG. 32 shows an R/A filter.

The configuration of an Add section which uses R/A filters each having four ports will be now described. First, the R/A filter will be explained with reference to FIG. 32. The R/A filter Fa has two input ports P1 and P2 and two output ports P3 and P4.

The R/A filter Fa transmits a predetermined wavelength of an optical signal input from the port P2 and outputs the transmitted wavelength from the port P3. Also, the remaining wavelengths of the optical signal input from the port P2 from which the predetermined wavelength has been rejected is transmitted through to the port P4. With respect to wavelengths input from the port P1, a wavelength corresponding to the predetermined wavelength input from the port P2 is rejected and the remaining wavelengths are transmitted through to the port P3.

Figure 33:
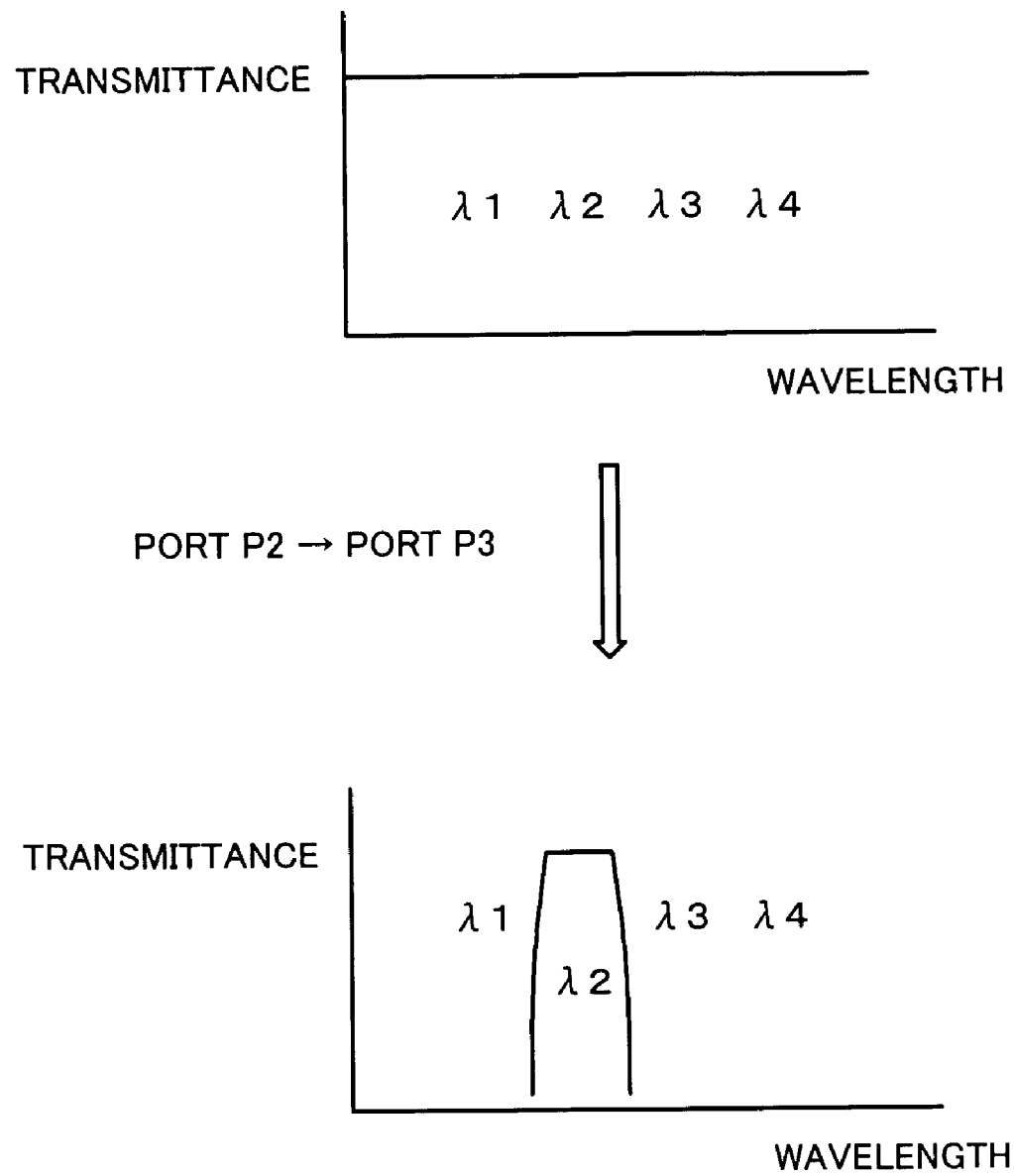
FIG. 33 illustrates the characteristic of the R/A filter.
Figure 34:
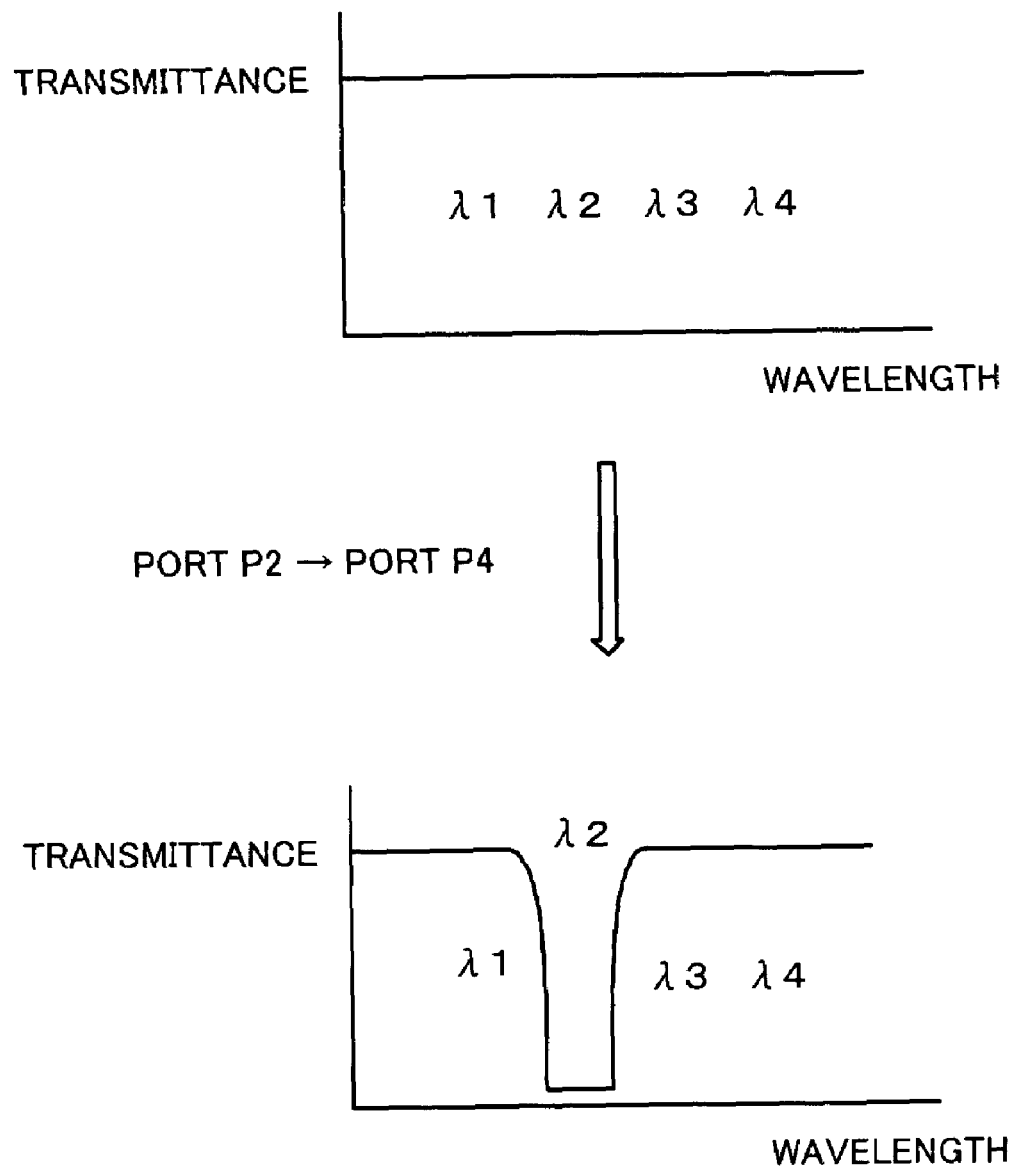
FIG. 34 also illustrates the characteristic of the R/A filter.
Figure 35:
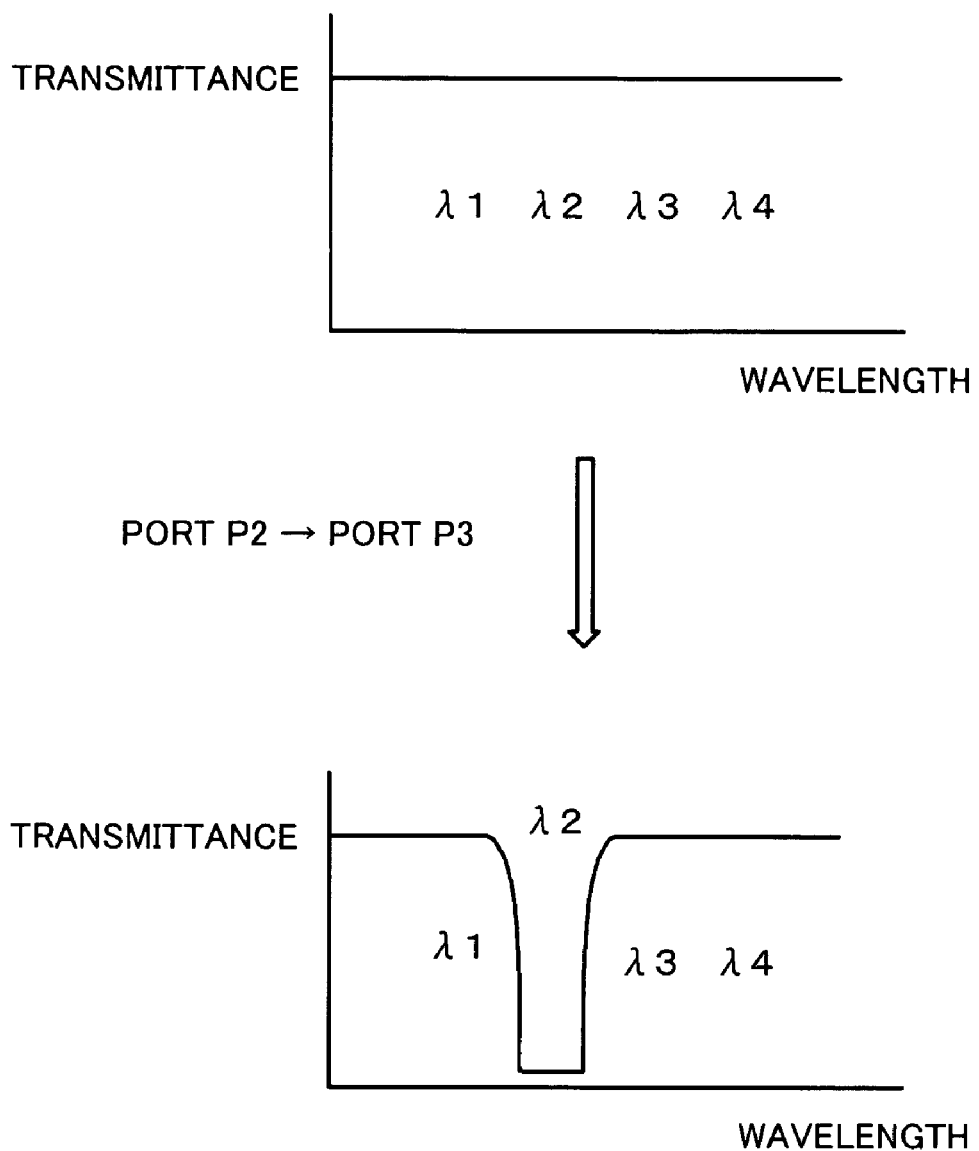
FIG. 35 also illustrates the characteristic of the R/A filter.

FIGS. 33 to 35 illustrate the characteristic of the R/A filter Fa, wherein the vertical axis indicates transmittance (dB) and the horizontal axis indicates wavelength. Specifically, FIG. 33 shows how light is transmitted from the port P2 to the port P3, FIG. 34 shows how light is transmitted from the port P2 to the port P4, and FIG. 35 shows how light is transmitted from the port P1 to the port P3.

In the case where the transmission wavelength of the R/A filter Fa is $\lambda 2$ and a signal in which wavelengths $\lambda 1$ to $\lambda 4$ are multiplexed is input from each of the ports P1 and P2, only the wavelength $\lambda 2$ among the wavelengths $\lambda 1$ to $\lambda 4$ input from the port P2 is transmitted to the port P3, as shown in FIG. 33. As shown in FIG. 34, among the wavelengths $\lambda 1$ to $\lambda 4$ input from the port P2, only the wavelength $\lambda 2$ is rejected and the remaining wavelengths $\lambda 1$, $\lambda 3$ and $\lambda 4$ are transmitted to the port P4. Also, as shown in FIG. 35, only the wavelength $\lambda 2$ among the wavelengths $\lambda 1$ to $\lambda 4$ input from the port P1 is rejected and the remaining wavelengths $\lambda 1$, $\lambda 3$ and $\lambda 4$ are transmitted to the port P3.

Figure 36:
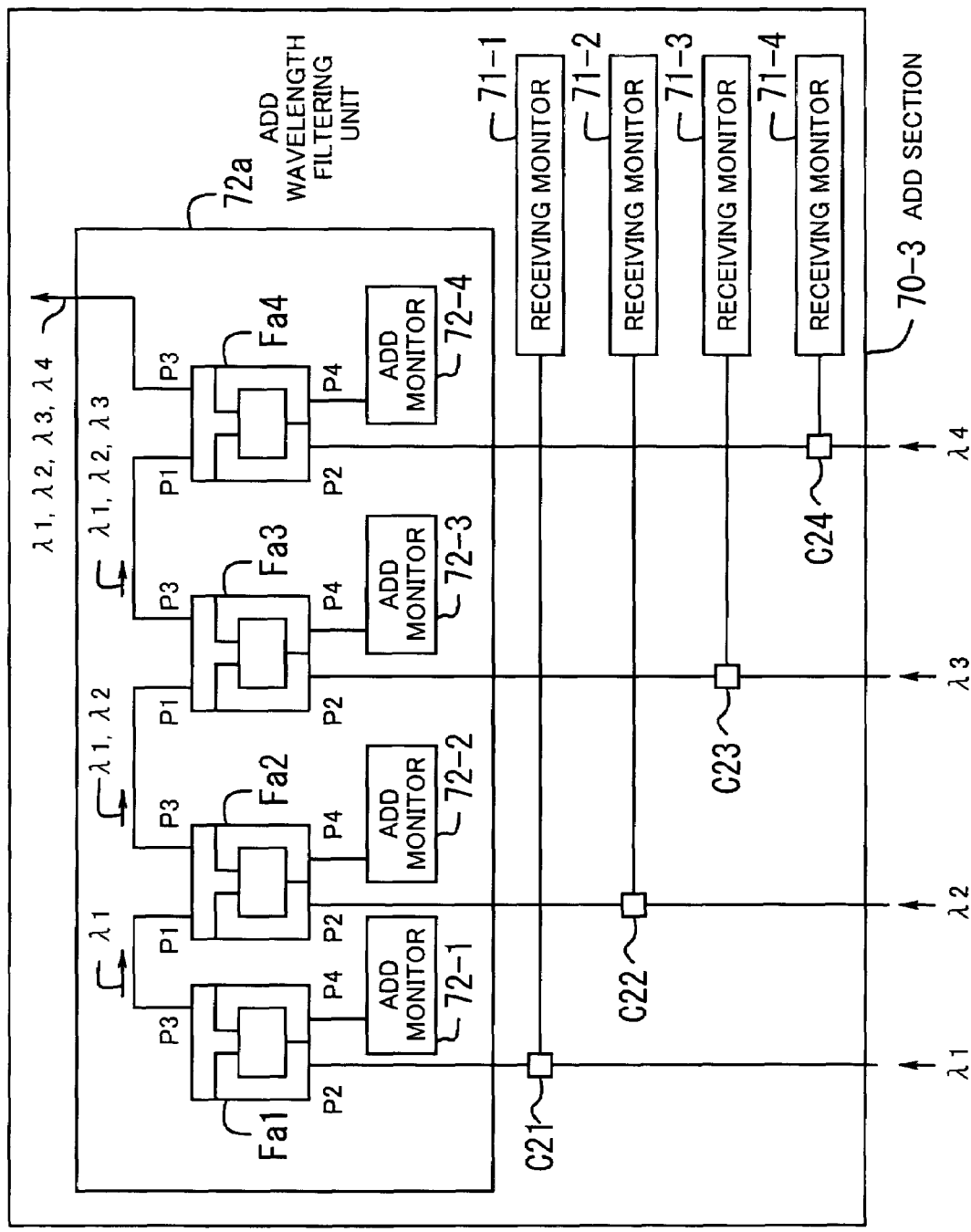
FIG. 36 shows the configuration of an Add section in an optical transmission device.

FIG. 36 shows the configuration of the Add section in an optical transmission device. The Add section 70-3 is configured to add four wavelengths and includes receiving monitors 71-1 to 71-4, couplers C21 to C24, and an Add wavelength filtering unit 72$a$. The Add wavelength filtering unit 72$a$ includes R/A filters Fa1 to Fa4 and Add monitors 72-1 to 72-4.

This configuration differs from that shown in FIG. 31 in that the R/A filters Fa1 to Fa4 are directly connected to each other in the form of daisy chain with the couplers C31 to C34 removed, and that the Add monitors 72-1 to 72-4 are connected to the ports P4 of the respective R/A filters Fa1 to Fa4.

Thus, by monitoring the reflected beams from the R/A filters Fa1 to Fa4 (output beams from the ports P4), it is possible to monitor the Add wavelengths. In this case, when the wavelengths are matched, no optical signal enters the Add monitors 72-1 to 72-4, and only when wrong wavelengths are input, optical signals enter the Add monitors. Accordingly, while no light enters the Add monitors 72-1 to 72-4, it can be judged that the correct wavelengths are input.

Figure 29:
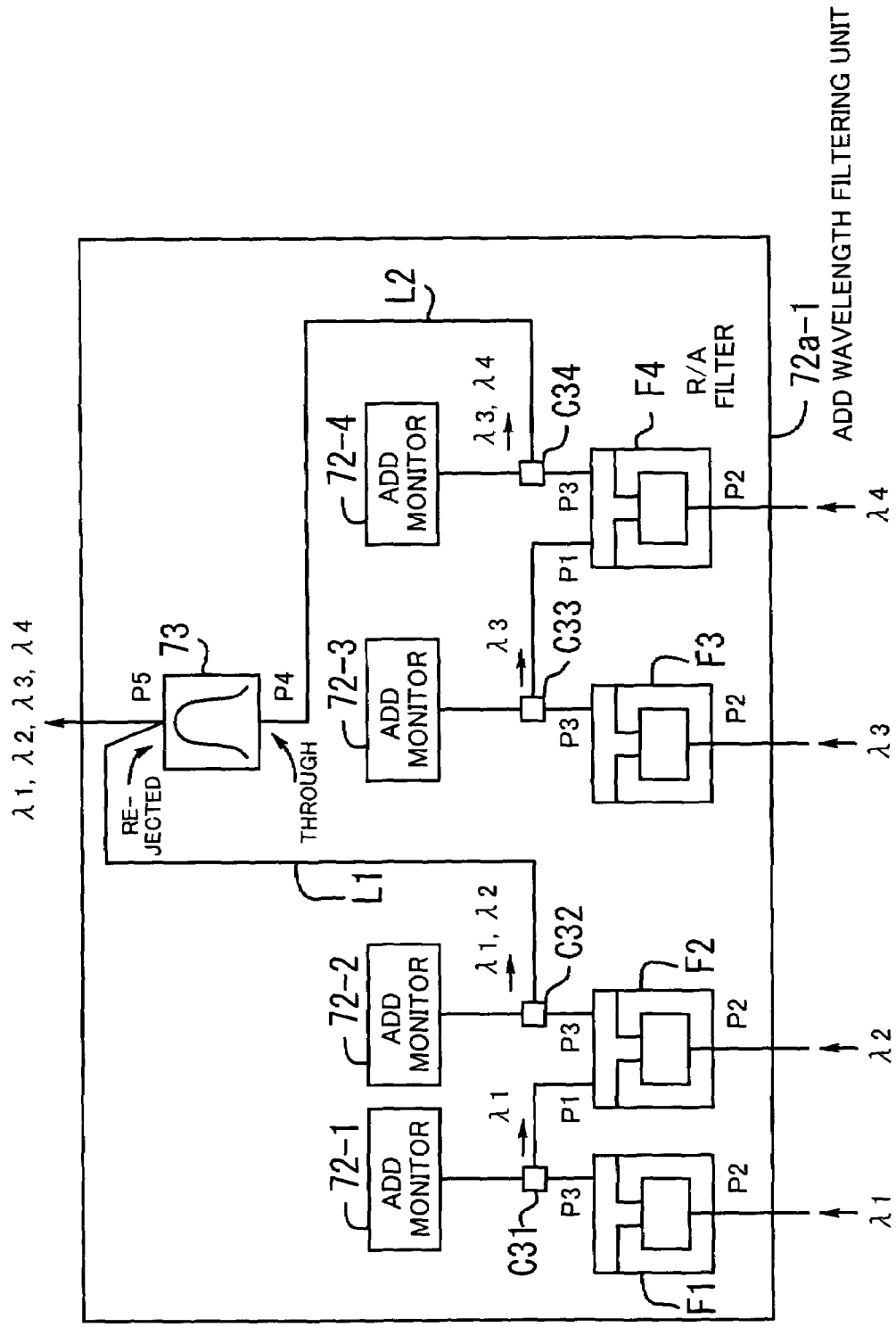
FIG. 29 shows a modification of an Add wavelength filtering unit.

Also in the Add section 70-3 of FIG. 36, a group-type R/A filter may be used as shown in FIG. 29. Further, in the case where a WDM signal from the network and the Add wavelengths are to be multiplexed, the Add section is configured in the manner described above with reference to FIGS. 30 and 31 (since the basic configuration and operation are the same, description is omitted).

As described above, the optical transmission device of the present invention comprises the wavelength selector and the reference wavelength monitor. In the wavelength selector, the control frequency is applied to the wavelength tunable filter while scanning wavelength over the entire signal bandwidth. Based on the received reference wavelength monitor signal, the wavelength selector detects a reference control frequency which permits the wavelength tunable filter to select a reference wavelength and in accordance with which wavelength matching is performed. When a wavelength selection request is received, a target control frequency obtained based on the reference control frequency and a relative position of a target wavelength with respect to the reference wavelength is applied to the wavelength tunable filter. This makes it possible to improve the control efficiency of the wavelength tunable filter and also to monitor the dropped optical wavelength, whereby an economical and reliable OADM network can be configured.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission device for transmitting an optical WDM signal, comprising:
    a wavelength selector including a wavelength tunable filter for variably selecting a wavelength in accordance with a control frequency, and a filter controller,
    the filter controller, performing:
        (a) applying the control frequency to the wavelength tunable filter,
        (b) detecting, based on a reference wavelength monitor signal supplied thereto, a reference control frequency which permits the wavelength tunable filter to select a reference wavelength and in accordance with which wavelength matching is performed,
        (c) obtaining, on reception of a wavelength selection request, a target control frequency based on the reference control frequency and a relative position of a target wavelength to be selected with respect to the reference wavelength, and
        (d) applying the target control frequency to the wavelength tunable filter; and
    a reference wavelength monitor including a reference wavelength filter for transmitting the reference wavelength therethrough, and a light receiving element for monitoring the transmitted reference wavelength to generate the reference wavelength monitor signal;
    wherein the wavelength tunable filter includes a plurality of wavelength tunable filters, and the reference wavelength monitor is configured to multiplex outputs of the wavelength tunable filters and generate the reference wavelength monitor signal through a single reference wavelength filter,
    while one of the wavelength tunable filters is subjected to wavelength scan for the wavelength matching, output levels of the other wavelength tunable filters are lowered by the respective filter controllers, and the wavelength-matched wavelength tunable filter is applied with a frequency other than the reference control frequency until the wavelength matching of all of the wavelength tunable filters is completed.

2. The optical transmission device according to claim 1, wherein the reference wavelength is derived from a reference wavelength light source which is arranged in a node at a location immediately in front of an input side of the wavelength tunable filter or which is arranged at a location such that the reference wavelength is propagated throughout a network, or is derived as one of wavelengths of a main optical signal.

3. The optical transmission device according to claim 2, wherein, where the reference wavelength is derived from the reference wavelength light source, the reference wavelength filter entirely cuts off the reference wavelength to prevent the reference wavelength from being transmitted therethrough to a succeeding stage, and where the reference wavelength is one of the wavelengths of the main optical signal, the reference wavelength filter partially cuts off the reference wavelength to allow the reference wavelength to be transmitted therethrough to a succeeding stage.

4. The optical transmission device according to claim 1, wherein the filter controller includes a temperature sensor, and when temperature change is detected by the temperature sensor, the filter controller again scans wavelength for the wavelength matching and acquires a new reference control frequency.

5. The optical transmission device according to claim 1, further comprising a monitor for monitoring a wavelength transmitted through the wavelength tunable filter to generate a monitor signal, and wherein, when the target wavelength is to be selected by the wavelength tunable filter, the filter controller varies the control frequency in the vicinity of the target control frequency based on the monitor signal, to determine an optimum target control frequency.

6. The optical transmission device according to claim 5, further comprising a switch arranged at an output stage of the wavelength tunable filter, and wherein the switch is turned OFF until the optimum target control frequency is determined by the filter controller, to prevent reception of an optical signal by an optical receiver arranged at a stage succeeding the wavelength tunable filter.

7. The optical transmission device according to claim 5, wherein, before the optimum target control frequency is determined, the filter controller applies the control frequency to the wavelength tunable filter with a level thereof set such that an output level of the wavelength tunable filter is lower than a minimum reception level of an optical receiver arranged at a stage succeeding the wavelength tunable filter, to prevent the optical receiver from receiving an optical signal.

8. The optical transmission device according to claim 1, wherein the optical transmission device has an upstream side with an optical signal add function and a downstream side with an optical signal drop function, and the wavelength selector, the reference wavelength monitor and a monitor for monitoring a wavelength transmitted through the wavelength tunable filter to generate a monitor signal are arranged on the downstream side having the optical signal drop function, to monitor the wavelength of an optical drop signal.

9. The optical transmission device according to claim 8, wherein the reference wavelength transmitted through the reference wavelength filter of the reference wavelength monitor is set to a wavelength equal to an optical add wavelength so as to monitor the wavelength of an optical add signal.

10. An optical add/drop device for adding/dropping an optical signal, comprising:
    an optical add section for multiplexing an incoming WDM signal from a network with an optical add signal to generate a multiplexed signal; and
    an optical drop section including a wavelength selector and a reference wavelength monitor, the wavelength selector including a wavelength tunable filter for variably selecting a wavelength among those of the multiplexed signal in accordance with a control frequency, and a filter controller,
    the filter controller, performing:
        (a) applying the control frequency to the wavelength tunable filter,
        (b) detecting, based on a reference wavelength monitor signal supplied thereto, a reference control frequency which permits the wavelength tunable filter to select a reference wavelength and in accordance with which wavelength matching is performed,
        (c) obtaining, on reception of a wavelength selection request, a target control frequency based on the reference control frequency and a relative position of a target wavelength to be selected with respect to the reference wavelength, and (d) applying the target control frequency to the wavelength tunable filter, the reference wavelength monitor including a reference wavelength filter for transmitting the reference wavelength therethrough, and a light receiving element for monitoring the transmitted reference wavelength to generate the reference wavelength monitor signal;

wherein the wavelength tunable filter includes a plurality of wavelength tunable filters, and the reference wavelength monitor is configured to multiplex outputs of the wavelength tunable filters and generate the reference wavelength monitor signal through a single reference wavelength filter, while one of the wavelength tunable filters is subjected to wavelength scan for the wavelength matching, output levels of the other wavelength tunable filters are lowered by the respective filter controllers, and the wavelength-matched wavelength tunable filter is applied with a frequency other than the reference control frequency until the wavelength matching of all of the wavelength tunable filters is completed.

11. The optical add/drop device according to claim 10, wherein the optical add section comprises an optical add signal receiver for receiving the optical add signal, and an optical add wavelength monitor including an optical add wavelength filter for transmitting an optical add wavelength therethrough and a light receiving element for monitoring the transmitted optical add wavelength to generate an optical add wavelength monitor signal.

12. The optical add/drop device according to claim 11, wherein the optical add signal receiver has a wavelength filter for transmitting only the optical add wavelength therethrough to thereby provide a fail-safe function.

13. The optical add/drop device according to claim 10, wherein the optical add section comprises receiving monitors for detecting presence/absence of respective incoming optical add signals, and an optical add wavelength filtering unit including a plurality of wavelength filters associated with the respective receiving monitors, each of the wavelength filters having first and second ports as input ports and a third port as an output port, a predetermined wavelength of the optical add signal input from the second port being transmitted to the third port, input wavelengths from the first port being transmitted to the third port except for a wavelength corresponding to the predetermined wavelength, the wavelength filters being connected together at the first and third ports in daisy chain form;

wherein, the optical add wavelength filtering unit includes the wavelength filters F1, F2, ..., Fn, and the daisy chain form is a wiring scheme in which the third port of the wavelength filter Fk ($1 \leq k \leq n-1$) is wired to the first port of the wavelength filter Fk+1.

14. The optical add/drop device according to claim 13, wherein the optical add wavelength filtering unit includes optical add monitors associated with the respective wavelength filters and connected to a line by which the wavelength filters are connected in the daisy chain form, and wavelengths of the optical add signals are monitored based on a relationship of optical power levels monitored by the optical add monitors.

15. The optical add/drop device according to claim 13, wherein the wavelength filters in the optical add wavelength filtering unit are divided into two filter groups, and the optical add wavelength filtering unit further includes a group filter for rejecting an optical signal output from the third port of the wavelength filter arranged at a last stage of one filter group and transmitting an optical signal output from the third port of the wavelength filter arranged at a last stage of the other filter group, thereby multiplexing the optical add signals.

16. The optical add/drop device according to claim 13, wherein the optical add section further includes a multiplexer for multiplexing an optical signal output from the third port of the wavelength filter arranged at a last stage in the optical add wavelength filtering unit with the incoming optical signal from the network and for transmitting the multiplexed signal to a next stage.

17. The optical add/drop device according to claim 13, wherein the incoming optical signal from the network is input to the first port of the wavelength filter arranged at a first stage in the optical add wavelength filtering unit, the optical add signals are input to the second ports, and a signal in which the optical signal and the optical add signals are multiplexed is output from the third port of the wavelength filter arranged at a last stage in the optical add wavelength filtering unit.

18. The optical add/drop device according to claim 10, wherein the optical add section comprises receiving monitors for detecting presence/absence of respective incoming optical add signals, and an optical add wavelength filtering unit including a plurality of wavelength filters associated with the respective receiving monitors, each of the wavelength filters having first and second ports as input ports and third and fourth ports as output ports, a predetermined wavelength of the optical add signal input from the second port being transmitted to the third port, remaining wavelengths of the optical add signal input from the second port, other than the predetermined wavelength, being transmitted to the fourth port, input wavelengths from the first port being transmitted to the third port except for a wavelength corresponding to the predetermined wavelength, the wavelength filters being connected together at the first and third ports in daisy chain form;

wherein, the optical add wavelength filtering unit includes the wavelength filters F1, F2, ..., Fn, and the daisy chain form is a wiring scheme in which the third port of the wavelength filter Fk ($1 \leq k \leq n-1$) is wired to the first port of the wavelength filter Fk+1.

19. The optical add/drop device according to claim 18, wherein the optical add wavelength filtering unit includes optical add monitors connected to the fourth ports of the respective wavelength filters, and wavelengths of the optical add signals are monitored in accordance with whether optical power is received by the optical add monitors.

20. The optical add/drop device according to claim 18, wherein the wavelength filters in the optical add wavelength filtering unit are divided into two filter groups, and the optical add wavelength filtering unit further includes a group filter for rejecting an optical signal output from the third port of the wavelength filter arranged at a last stage of one filter group and transmitting an optical signal output from the third port of the wavelength filter arranged at a last stage of the other filter group, thereby multiplexing the optical add signals.

21. The optical add/drop device according to claim 18, wherein the optical add section further includes a multiplexer for multiplexing an optical signal output from the third port of the wavelength filter arranged at a last stage in the optical add wavelength filtering unit with the incoming optical signal from the network and for transmitting the multiplexed signal to a next stage.

22. The optical add/drop device according to claim 18, wherein the incoming optical signal from the network is input to the first port of the wavelength filter arranged at a first stage in the optical add wavelength filtering unit, the optical add signals are input to the second ports, and a signal in which the optical signal and the optical add signals are multiplexed is output from the third port of the wavelength filter arranged at a last stage in the optical add wavelength filtering unit.

23. The optical add/drop device according to claim 10, wherein the optical drop section derives the reference wavelength from a reference wavelength light source which is arranged in a node at a location immediately in front of an input side of the wavelength tunable filter or which is arranged at a location such that the reference wavelength is propagated throughout a network, or derives the reference wavelength as one of wavelengths of a main optical signal.

24. The optical add/drop device according to claim 23, wherein, where the reference wavelength is derived from the reference wavelength light source, the reference wavelength filter entirely cuts off the reference wavelength to prevent the reference wavelength from being transmitted therethrough to a succeeding stage, and where the reference wavelength is one of the wavelengths of the main optical signal, the reference wavelength filter partially cuts off the reference wavelength to allow the reference wavelength to be transmitted therethrough to a succeeding stage.

25. The optical add/drop device according to claim 10, wherein the filter controller includes a temperature sensor, and when temperature change is detected by the temperature sensor, the filter controller again scans wavelength for the wavelength matching and acquires a new reference control frequency.

26. The optical add/drop device according to claim 10, wherein the optical drop section further includes a monitor for monitoring a wavelength transmitted through the wavelength tunable filter to generate a monitor signal, and when the target wavelength is to be selected by the wavelength tunable filter, the filter controller varies the control frequency in the vicinity of the target control frequency based on the monitor signal, to determine an optimum target control frequency.

27. The optical add/drop device according to claim 26, wherein the optical drop section further includes a switch arranged at an output stage of the wavelength tunable filter, and the switch is turned OFF until the optimum target control frequency is determined by the filter controller, to prevent reception of an optical signal by an optical receiver arranged at a stage succeeding the wavelength tunable filter.

28. The optical add/drop device according to claim 26, wherein, before the optimum target control frequency is determined, the filter controller applies the control frequency to the wavelength tunable filter with a level thereof set such that an output level of the wavelength tunable filter is lower than a minimum reception level of an optical receiver arranged at a stage succeeding the wavelength tunable filter, to prevent the optical receiver from receiving an optical signal.

29. The optical add/drop device according to claim 10, wherein the optical add/drop device has an upstream side with an optical signal add function and a downstream side with an optical signal drop function, and the wavelength selector, the reference wavelength monitor and a monitor for monitoring a wavelength transmitted through the wavelength tunable filter to generate a monitor signal are arranged on the downstream side having the optical signal drop function, to monitor the wavelength of an optical drop signal.

30. The optical add/drop device according to claim 29, wherein the reference wavelength transmitted through the reference wavelength filter of the reference wavelength monitor is set to a wavelength equal to an optical add wavelength so as to monitor the wavelength of the optical add signal.

31. An optical transmission device for transmitting an optical WDM signal, comprising:
a wavelength selector including a wavelength tunable filter for variably selecting a wavelength in accordance with a control frequency, and a filter controller
the filter controller, comprising the steps of:
(a) applying the control frequency to the wavelength tunable filter,
(b) detecting, based on a reference wavelength monitor signal supplied thereto, a reference control frequency which permits the wavelength tunable filter to select a reference wavelength and in accordance with which wavelength matching is performed,
(c) obtaining, on reception of a wavelength selection request, a target control frequency based on the reference control frequency and a relative position of a target wavelength to be selected with respect to the reference wavelength, and
(d) applying the target control frequency to the wavelength tunable filter;
a reference wavelength monitor including a reference wavelength filter for transmitting the reference wavelength therethrough, and a light receiving element for monitoring the transmitted reference wavelength to generate the reference wavelength monitor signal; and
a monitor for monitoring a wavelength transmitted through the wavelength tunable filter to generate a monitor signal, and wherein, when the target wavelength is to be selected by the wavelength tunable filter, the filter controller varies the control frequency in the vicinity of the target control frequency based on the monitor signal, to determine an optimum target control frequency;
wherein, before the optimum target control frequency is determined, the filter controller applies the control frequency to the wavelength tunable filter with a level thereof set such that an output level of the wavelength tunable filter is lower than a minimum reception level of an optical receiver arranged at a stage succeeding the wavelength tunable filter, to prevent the optical receiver from receiving an optical signal.

32. The optical transmission device according to claim 31, further comprising a switch arranged at an output stage of the wavelength tunable filter, and wherein the switch is turned OFF until the optimum target control frequency is determined by the filter controller, to prevent reception of an optical signal by an optical receiver arranged at a stage succeeding the wavelength tunable filter.

33. An optical add/drop device for adding/dropping an optical signal, comprising:
an optical add section for multiplexing an incoming WDM signal from a network with an optical add signal to generate a multiplexed signal; and
an optical drop section including a wavelength selector and a reference wavelength monitor, the wavelength selector including a wavelength tunable filter for variably selecting a wavelength among those of the multiplexed signal in accordance with a control frequency, and a filter controller,
the filter controller, comprising the steps of:
(a) applying the control frequency to the wavelength tunable filter,
(b) detecting, based on a reference wavelength monitor signal supplied thereto, a reference control frequency which permits the wavelength tunable filter to select a reference wavelength and in accordance with which wavelength matching is performed, (c) obtaining, on reception of a wavelength selection request, a target control frequency based on the reference control frequency and a relative position of a target wavelength to be selected with respect to the reference wavelength, and (d) applying the target control frequency to the wavelength tunable filter, the reference wavelength monitor including a reference wavelength filter for transmitting the reference wavelength therethrough, and a light receiving element for monitoring the transmitted reference wavelength to generate the reference wavelength monitor signal;

wherein the optical drop section further includes a monitor for monitoring a wavelength transmitted through the wavelength tunable filter to generate a monitor signal, and when the target wavelength is to be selected by the wavelength tunable filter, the filter controller varies the control frequency in the vicinity of the target control frequency based on the monitor signal, to determine an optimum target control frequency;

and wherein, before the optimum target control frequency is determined, the filter controller applies the control frequency to the wavelength tunable filter with a level thereof set such that an output level of the wavelength tunable filter is lower than a minimum reception level of an optical receiver arranged at a stage succeeding the wavelength tunable filter, to prevent the optical receiver from receiving an optical signal.

34. The optical add/drop device according to claim 33, wherein the optical drop section further includes a switch arranged at an output stage of the wavelength tunable filter, and the switch is turned OFF until the optimum target control frequency is determined by the filter controller, to prevent reception of an optical signal by an optical receiver arranged at a stage succeeding the wavelength tunable filter.

* * * * *